United States Patent
Hadap et al.

(10) Patent No.: US 10,692,265 B2
(45) Date of Patent: *Jun. 23, 2020

(54) NEURAL FACE EDITING WITH INTRINSIC IMAGE DISENTANGLING

(71) Applicant: Adobe Inc., San Jose, CA (US)

(72) Inventors: Sunil Hadap, Dublin, CA (US); Elya Shechtman, Seattle, WA (US); Zhixin Shu, South Setauket, NY (US); Kalyan Sunkavalli, San Jose, CA (US); Mehmet Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,733

(22) Filed: Nov. 7, 2019

(65) Prior Publication Data
US 2020/0090389 A1    Mar. 19, 2020

Related U.S. Application Data

(63) Continuation of application No. 15/622,711, filed on Jun. 14, 2017, now Pat. No. 10,565,758.

(51) Int. Cl.
*G06K 9/62*    (2006.01)
*G06T 11/60*    (2006.01)
*G06T 5/00*    (2006.01)
*G06N 3/04*    (2006.01)
*G06N 3/08*    (2006.01)

(52) U.S. Cl.
CPC ........... *G06T 11/60* (2013.01); *G06N 3/0454* (2013.01); *G06N 3/084* (2013.01); *G06T 5/005* (2013.01); *G06N 3/0445* (2013.01); *G06N 3/088* (2013.01); *G06T 2207/20081* (2013.01); *G06T 2207/30201* (2013.01)

(58) Field of Classification Search
CPC .... G06N 3/0445; G06N 3/0454; G06N 3/084; G06N 3/088; G06T 11/60
USPC ......................................................... 382/156
See application file for complete search history.

(56) References Cited

U.S. PATENT DOCUMENTS

| 6,873,724 | B2* | 3/2005 | Brand | ..................... G06T 17/10 |
| | | | | 345/419 |
| 2017/0263031 | A1* | 9/2017 | Chaudhary | ............. G06T 11/60 |

OTHER PUBLICATIONS

Barron, et al., "Shape, Illumination, and Reflectance from Shading," IEEE Transactions on Pattern Analysis and Machine Intelligence, 37(8): 2015. 19 pages.

(Continued)

*Primary Examiner* — Charlotte M Baker
(74) *Attorney, Agent, or Firm* — Finch & Maloney PLLC

(57) ABSTRACT

Techniques are disclosed for performing manipulation of facial images using an artificial neural network. A facial rendering and generation network and method learns one or more compact, meaningful manifolds of facial appearance, by disentanglement of a facial image into intrinsic facial properties, and enables facial edits by traversing paths of such manifold(s). The facial rendering and generation network is able to handle a much wider range of manipulations including changes to, for example, viewpoint, lighting, expression, and even higher-level attributes like facial hair and age—aspects that cannot be represented using previous models.

20 Claims, 15 Drawing Sheets
(6 of 15 Drawing Sheet(s) Filed in Color)

(56) References Cited

OTHER PUBLICATIONS

Basri, R. and Jacobs, D.W., "Lambertian Reflectance and Linear Subspaces," IEEE Transactions on Pattern Analysis and Machine Intelligence, 25(2): 2003. 8 pages.
Gross, et al., "Multi-PIE," Proc Int Conf Autom Face Gesture Recognit, 28(5): May 1, 2010.21 pages.
Liu, et al., "Deep Learning Face Attributes in the Wild," arXiv. 1411.7766v3. Sep. 24, 2015. 11 pages.
Ramamoorthi, R. and Hanrahan, P., "On the relationship between radiance and irradiance: determining the illumination from images of a convex Lambertian object," J. Opt. Soc. Am. A/vol. 18, No. 10. Oct. 2001. pp. 2448-2459.
Weyrich, et al., "Analysis of Human Faces Using a Measurement-Based Skin Reflectance Model," ACM Trans. Graph., 25(3): Jul. 2006. 12 pages.
Barrow, H.G. and Tenenbaum, J. Martin, "Recovering Intrinsic Scene Characteristics From Images," Technical Note 157, Apr. 1978. 23 pages.
Bengio, et al., "Representation Learning: A Review and New Perspectives," arXiv.1206.5538v3. Apr. 23, 2014. 30 pages.
Blanz, et al., "Reanimating Faces in Images and Video," EUROGRAPHICS 2003, vol. 22 (2003), No. 3. 10 pages.
Blanz, V. and Vetter, T., "A Morphable Model for the Synthesis of 3D Faces," Proceedings of the 26th Annual Conference on Computer Graphics and Interactive Techniques. 1999. pp. 187-194.
Cao, et al., "FaceWarehouse: a 3D Facial Expression Database for Visual Computing," IEEE transactions on Visualization and Computer Graphics, 20(3): Mar. 2014. 11 pages.
Chai, et al., "High-Quality Hair Modeling from a Single Portrait Photo," ACM Trans. Graph., 34(6): Oct. 2015. 10 pages.
Chai, et al., "AutoHair: Fully Automatic Hair Modeling from a Single Image," ACM Trans. Graph., 35(4): 2016. 12 pages.
Gardner, et al., "Deep Manifold Traversal: Changing Labels with Convolutional Features," arXiv1511.06421v3. Mar. 17, 2016. 17 pages.
Goodfellow, et. al., "Generative Adversarial Nets," Advances in Neural Information Processing Systems, 2014. 9 pages.
Hassner, Tal, "Viewing Real-World Faces in 3D," Proceedings of the IEEE International Conference on Computer Vision, 2013. pp. 3607-3614.
Hassner, et al., "Effective Face Frontalization in Unconstrained Images," Proceedings of the IEEE Conference on Computer Vision and Pattern Recognition, 2015. pp. 4295-4304.
Kemelmacher-Shlizerman, Ira, "Transfiguring Portraits," ACM Transactions on Graphics, 35(4):94. 2016. 8 pages.
Kemelmacher-Shlizerman, Ira and Seitz, Steven M., "Face Reconstruction in the Wild," IEEE International Conference on Computer Vision, 2011. 8 pages.
Kemelmacher-Shlizerman, et al., "Ilumination-Aware Age Progression," IEEE Conference on Computer Vision and Pattern Recognition, 2014. 8 pages.
Kingma, Diederik P. and Welling, Max, "Auto-Encoding Variational Bayes," arXiv: 1312.6114v10, May 1, 2014. 14 pages.
Kulkarni, et al., "Deep Convolutional Inverse Graphics Network," Advances in Neural Information Processing Systems(28): 2015. 9 pages.
Kumar, et al., "Attribute and Simile Classifiers for Face Verification," IEEE 12th International Conference on Computer Vision, 2009. 8 pages.
Land, Edwin H. and McCann, John J., "Lightness and Retinex Theory," Journal of the Optical Society of America, vol. 61, No. 1. Jan. 1971. 11 pages.
Liu, et al., "Expressive Expression Mapping with ratio Images," Proceedings of the 28th Annual Conference on Computer Graphics and Interactive Techniques. 2001. pp. 271-276.
Masi, et al., "Do We Really Need to Collect Millions of Faces for Effective Face Recognition?" arXiv:1603.07057v2, Apr. 11, 2016. 18 pages.
Parkhi, et al., "Deep Face Recognition," British Machine Vision Conference, vol. 1. 2015. 12 pages.
Saragih, Jason, "Principal Regression Analysis," IEEE Conference on Computer Vision and Pattern Recognition, 2011. p. 2881-2888.
Schroff, et al., "FaceNet: A Unified Embedding for Face Recognition and Clustering," IEEE Conference on Computer Vision and Pattern Recognition, 2015. p. 815-823.
Shu, et al., "EyeOpener: Editing Eyes in the Wild," ACM Trans. Graph. 36(1). Sep. 2016. 13 pages.
Taigman, et al., "DeepFace: Closing the Gap to Human-Level Performance in Face Verification," Proceedings of the IEEE Conference on Computer Vision and Pattern Recognition. 2014. 8 pages.
Tatarchenko, et al., "Multi-view 3D Models from Single Images with a Convolutional Network," arXiv: 1511.06702v2. Aug. 2, 2016. 20 pages.
Thies, et al., "Face2Face: Real-time Face Capture and Reenactment of RGB Videos," Proceedings of the IEEE Conference on Computer Vision and Pattern Recognition. 2016. 9 pages.
Vlasic, et al., "Face Transfer with Multilinear Models," ACM Trans. Graph. 24(3). Jul. 2005. 8 pages.
Wang, et al., "Face Re-Lighting from a Single Image under Harsh Lighting Conditions," Proceedings of the IEEE Conference on Computer Vision and Pattern Recognition. Jun. 2007. 8 pages.
Wang, et al., "Face Relighting from a Single Image under Arbitrary Unknown Lighting Conditions," IEEE Transactions on Pattern Analysis and Machine Intelligence, vol. 31, No. 11. Nov. 2009. pp. 1968-1984.
Yan, et al., "Attribute2Image: Conditional Image Generation from Visual Attributes," arXiv: 1512.00570v2. Oct. 8, 2016. 19 pages.
Yang, et al., "Expression Flow for 3D-Aware Face Component Transfer," ACM Transactions on Graphics, vol. 30. 2011. 10 pages.
Yang, et al., "Weakly-supervised Disentangling with Recurrent Transformations for 3 D View Synthesis," Advances in Neural Information Processing Systems. 2015. 9 pages.
Zhao, et al., "Energy-Based Generative Adversarial Networks," arXiv:1609.03126v4. Mar. 6, 2017. 17 pages.
Shu, et al., "Neural face Editing with Intrinsic Image Disentangling," arXiv:1704.04131v1. Apr. 13, 2017. 22 pages.
Chen et al., "Face illumination transfer through edge-preserving filters", In Proceedings of the IEEE Conference on Computer Vision and Pattern Recognition, pp. 281-287 (2011).
Wen et al., "Face relighting with radiance environment maps", In Proceedings of the IEEE Conference on Computer Vision and Pattern Recognition, vol. 2, pp. II-158 (2003).

\* cited by examiner

Standard Autoencoder

NEURAL FACE EDITING WITH INTRINSIC IMAGE DISENTANGLING

CROSS-REFERENCE TO RELATED APPLICATIONS

This is a continuation of U.S. patent application Ser. No. 15/622,711 (filed 14 Jun. 2017), the entire disclosure of which is hereby incorporated by reference herein.

FIELD OF THE DISCLOSURE

This disclosure relates to techniques for manipulation of facial images and more particularly to the use of deep learning and artificial neural networks for performing manipulation of facial images.

BACKGROUND

Understanding and manipulating face images in-the-wild is of great interest to the computer vision and graphics community, and as a result, has been extensively studied in previous work. Example techniques range from relighting portraits (for example, Y. Wang, Z. Liu, G. Hua, Z. Wen, Z. Zhang, and D. Samaras, "Face Re-lighting from a Single Image Under Harsh Lighting Conditions", Pages 1-8, June 2007), editing or exaggerating expressions (for example, F. Yang, J. Wang, E. Shechtman, L. Bourdev, and D. Metaxas, Expression Flow for 3d-aware Face Component Transfer, ACM Transactions on Graphics (TOG), volume 30, page 60, ACM, 2011), and even driving facial performances (for example, F. Yang, J. Wang, E. Shechtman, L. Bourdev, and D. Metaxas, "Expression Flow for 3d-aware Face Component Transfer", ACM Transactions on Graphics (TOG), volume 30, page 60, ACM, 2011). Many of these methods start by explicitly reconstructing facial attributes such as geometry, texture, and illumination, and then editing these attributes in the image. However, reconstructing these attributes is a challenging and often ill-posed task. Previous techniques attempt to address these challenges by either utilizing more data (for example, RGBD video streams) or imposing a strong prior on the reconstruction that is adapted to the particular editing task that is to be solved (for example, utilizing low dimensional geometry). As a result, these techniques tend to be both costly (with respect to use of computational resources) and error-prone. Moreover, such techniques fail to generalize at scale.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
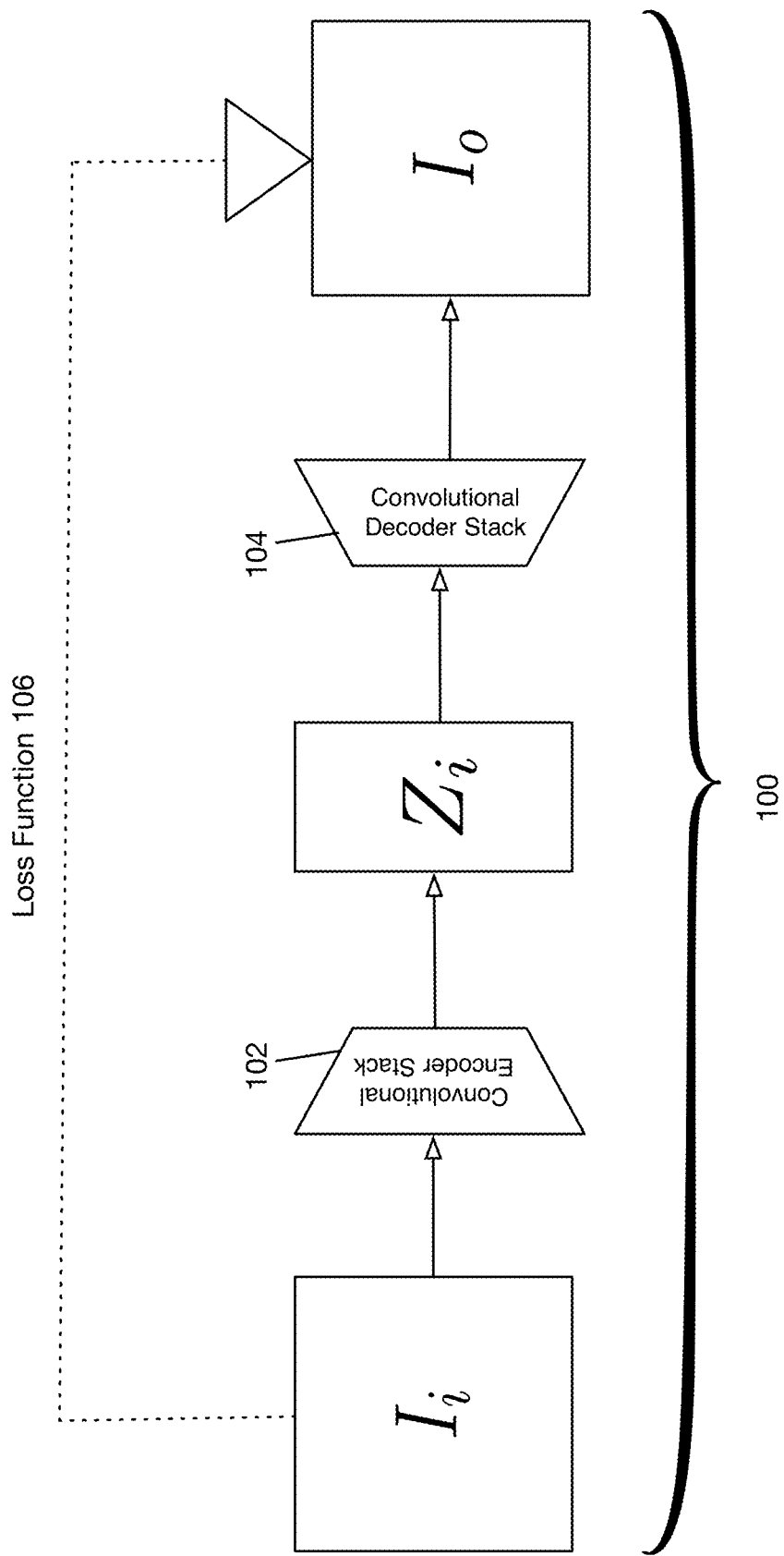
FIG. 1 is a block diagram of a standard autoencoder for image processing.

Techniques are disclosed for performing manipulation of facial images using a neural network architecture. In one an example embodiment, the neural network architecture includes a disentanglement portion and a rendering portion. The disentanglement portion of the network is trained to disentangle at least one physical property captured in the facial image, such that the disentanglement portion receives a facial image and outputs a disentangled representation of that facial image based on the at least one physical property. The rendering portion of the network receives or otherwise has access to the disentangled representation and is trained to perform a facial manipulation of the facial image based upon an image formation equation and the at least one physical property, thereby generating a manipulated facial image. The at least one physical property may include, for example, at least one of diffuse albedo, a surface normal, a matte mask, a background, a shape, a texture, illumination, and shading. These properties are also referred to herein as intrinsic facial properties. As will be appreciated, the network is able to handle a much wider range of manipulations including changes to, for example, viewpoint, lighting, expression, and even higher-level attributes like facial hair and age—aspects that cannot be represented using previous techniques. Significant advantages can be realized, including the ability to learn a model for a given facial appearance in terms of intrinsic (or physical) facial properties without the need for expensive data capture (for example, calibrated appearance and geometry capture).

In some embodiments, the disentanglement portion of the network includes one or more first layers, each first layer encoding a respective map. Each map performs a transformation of the input image to a respective first intermediate result. Each respective first intermediate result is associated with an intrinsic facial property (for example, geometry, diffuse albedo, or illumination), sometimes referred to herein as physical properties. The rendering portion of the network includes one or more second layers arranged according to an image formation equation for manipulating a facial image. The rendering portion operates on the first intermediate result(s) to generate a manipulated facial image. In some such cases, the disentanglement portion of the network further includes a respective first intermediate loss function associated with each map. In some such embodiments, during a training phase, each respective first intermediate loss function causes an inference with respect to a corresponding facial property of said respective map.

Trivially applying autoencoder networks to learn "good" facial features from large amounts of data often leads to representations that are not meaningful making the subsequent editing challenging. According to various embodiments of the present disclosure, a network can be trained to infer approximate models for facial appearance in terms of intrinsic face properties such as geometry (surface normals), material properties (diffuse albedo), illumination, and shading. Merely introducing these factors into the network, however, is not sufficient because of the ill-posed nature of the inverse rendering problem as the learned intrinsic properties can be arbitrary. Instead, according to some embodiments provided herein, a network is guided by imposing priors on each of the intrinsic properties. These priors may include, for example, a morphable model-driven prior on the geometry, a Retinex-based prior on the albedo, and an assumption of low-frequency spherical harmonics-based lighting model. Under these constraints, utilizing adversarial supervision on image reconstruction and weak supervision on the inferred face intrinsic properties, various network embodiments can learn disentangled representations of facial appearance.

According to one embodiment, a matte layer may be introduced to disentangle the foreground (face) and the natural image background. Furthermore, according to various embodiments, low-dimensional manifold embeddings are exposed for each of the intrinsic facial properties, which in turn enables direct and data-driven semantic editing from a single input image. For example, direct illumination editing using explicit spherical harmonics lighting built into the network may be performed. In addition, semantically meaningful expression edits such as smiling-based edits, and more structurally global edits such as aging may be achieved. Thus, an end-to-end generative network specifically designed for understanding and editing of face images in the wild is provided herein. According to some embodiments, image formation and shading process may be encoded as in-network layers enabling physically based rendering element disentangling such as shape, illumination, and albedo in latent space. Further, according to other embodiments statistical loss functions that correspond to well-studied theories (such as Batchwise White Shading ("BWS")) corresponding to color consistency theory are used to help improve disentangling of latent representations.

FIG. 1 is a block diagram of a standard autoencoder for image processing. Autoencoder 100 comprises convolutional encoder stack 102 and convolutional decoder stack 104. Autoencoder 100 receives input image $I_i$ and generates output image $I_o$. Convolutional encoder stack 102 has one input layer and any number of hidden layers (not shown in FIG. 1) and operates to map an input image $I_i$ to a lower dimensional representation $Z_i$, which is also referred to as a latent variable or latent representation. Convolutional decoder stack 104 has one output layer and any number of hidden layers (not shown in FIG. 1) and maps latent variable $Z_i$ to a reconstruction of the input image $I_o$ having the same dimensionality as input image $I_i$. As depicted in FIG. 1, training of autoencoder 100 is performed using global loss function 106 (for example, a square error loss function), which measures the deviation of $I_o$ from $I_i$. Note the lack of disentanglement of input image $I_i$ into intrinsic facial properties. Furthermore, note the lack of any intermediate loss functions.

Figure 2A:
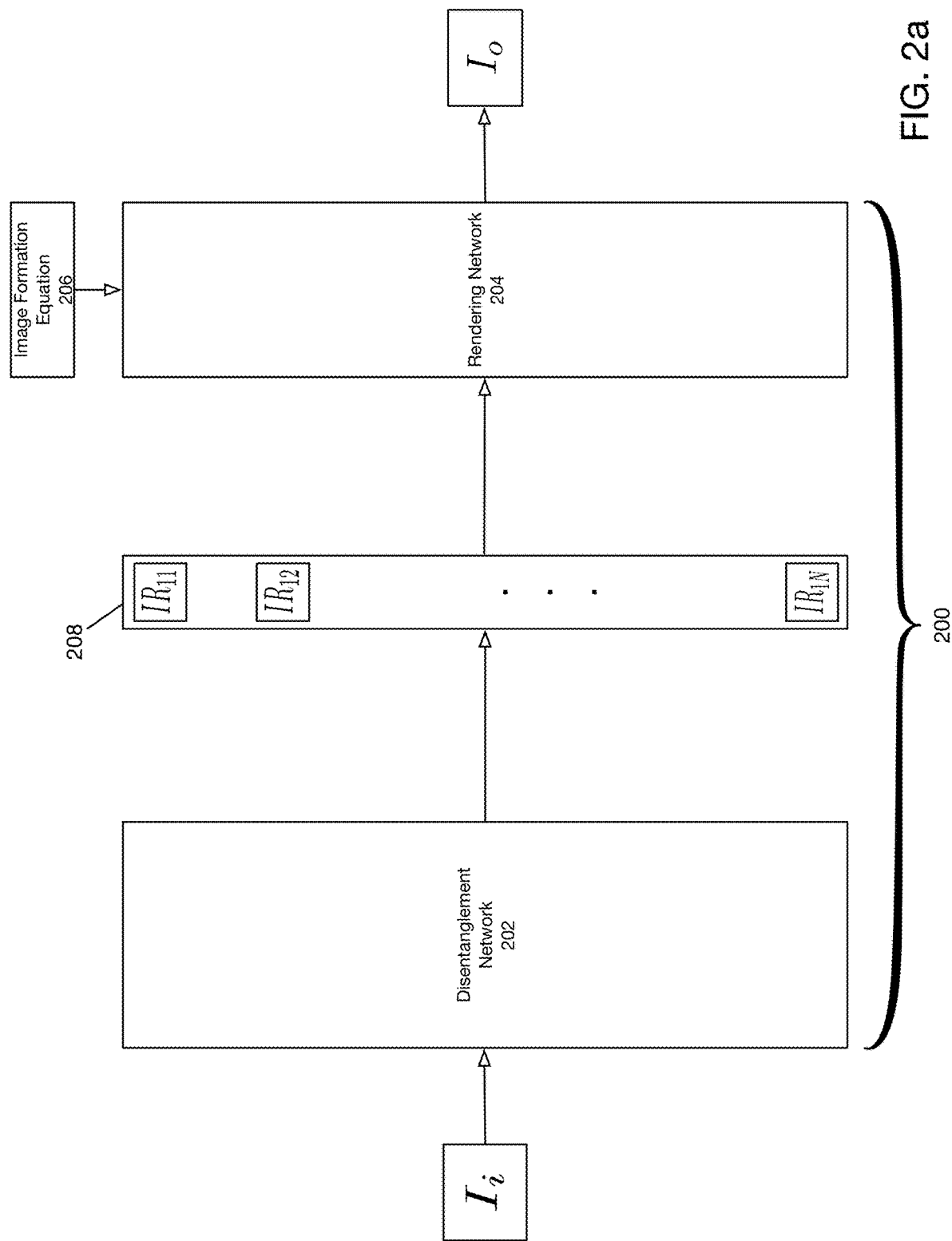
FIG. 2a is a block diagram of a network architecture for performing facial manipulation according to one embodiment of the present disclosure.

FIG. 2a is a block diagram of a network for performing facial manipulation according to one embodiment of the present disclosure. According to one embodiment facial image manipulation network 200 may be a deep neural network and may incorporate feedforward neural network elements, convolutional neural network elements, recurrent neural network elements, and any other suitable static or dynamic neural networks. As will be appreciated, facial image manipulation network may further comprise an arbitrary number of neural network layers arranged in a particular architecture (particular layer sizes (number of units) and their intercoupling). Each layer in turn will further comprise a set of artificial neuron units. Each unit will further be associated with a respective bias parameter and activation function. Further, units in different layers may be coupled to one another, wherein each respective coupling between units is associated with a weight value.

As will be further recognized, facial image manipulation network 200 will typically undergo a supervised learning or training phase in which both the aforementioned weights, which codify the intercoupling between artificial neural units and the biases of respective artificial neural units are learned by employing an optimization method such as gradient descent. The learning phase will typically utilize a set of training data and validation data. Full batch learning, mini-batch learning, stochastic gradient descent or any other training methods may be employed. Further, updating of the weights and biases during the learning/training phase may utilize the backpropagation algorithm. Upon training of facial image manipulation network 200, a test phase may then be conducted using arbitrary input facial images $I_i$, which are processed by the network 200 using the learned weights and biases from the learning/training phase.

As can be seen in this example embodiment, facial image manipulation network 200 comprises a disentanglement network or portion 202 and a rendering network or portion 204. As will be appreciated, each network or portion 202 and 204 may include one or more layers (for example, input layers, middle layers, hidden layers, output layers). At a high level, disentanglement network 202 operates to disentangle an input facial image $I_i$ into intrinsic facial properties (described below). The output of disentanglement network 202 is generally depicted as a disentangled representation 208 of input image $I_i$. Rendering network 204 may then operate on these disentangled intrinsic facial properties to render various facial manipulations. Thus, facial image manipulation network 200 receives input image $I_i$ and ultimately generates output image $I_o$, which represents a desired facially manipulated representation of input image $I_i$. For example, output image $I_o$ may be a facial image that includes facial hair or some other perceptible feature that was not present in input image $I_i$. In another example, output image $I_o$ may be a facial image that displays glasses that were not present in input image $I_i$. In another example, output image $I_o$ may be a facial image that includes a smile rather than pursed lips present in input image $I_i$.

As will be appreciated in light of this disclosure, both input image $I_i$ and output image $I_o$ are representations of facial images in an image space. That is, according to one embodiment, input and output images ($I_i$ and $I_o$) comprise pixel data values for facial images. Input and output images $I_i$ and $I_o$ may be greyscale or color images. In the former case, pixel values may thereby describe greyscale intensity values while in the latter case, pixel values may describe RGB ("Red-Green-Blue") intensity values. Further, input and output images ($I_i$ and $I_o$) may represent 2-D or 3-D images. It will be further understood, that in the case of 2-D images, although input image and output image representations ($I_i$ and $I_o$) may be represented by a 2-D matrix corresponding to the pixel values in a 2-D image, some reshaping of the data comprising input image $I_i$ and output image $I_o$ may be performed such as reshaping into a 1-D vector prior to processing by facial image manipulation network 200.

As further shown in FIG. 2a, disentangled representation 208 comprises a plurality of intermediate results $IR_{11}$-$IR_{1N}$. Intermediate results $IR_{11}$-$IR_{1N}$ refer to the fact that they specifically codify an interim or non-final output in the network. That is, ultimately intermediate results $IR_{11}$-$IR_{1N}$ will be further processed via layers within rendering network 204, which are ultimately utilized to generate output image $I_o$. According to one embodiment, intermediate results $IR_{11}$-$IR_{1N}$ may represent intrinsic properties of a facial image, including for example, albedo ($A_e$), surface normal ($N_e$), illumination (L), background ($I_{bg}$), and matte mask (M) described in detail below. As will become evident, intermediate results $IR_{11}$-$IR_{1N}$ may be generated from respective corresponding latent variables. The operation of disentanglement network 202 will be described below with respect to FIG. 2b.

Rendering network 204 operates to generate output image $I_o$, which is a rendered facial manipulation of input image $I_i$ using intermediate results $IR_{11}$-$IR_{1N}$ generated by disentanglement network 202. In particular, according to one embodiment, rendering network 204 utilizes an architecture based upon image formation equation 206. Example image formation equations are described below. For purposes of the current discussion, it is sufficient to understand that rendering network 204 comprises a plurality of neural network layers arranged in an architecture based upon image formation equation 206. Each of the neural network layers in rendering network 204 may generate respective intermediate results, which may then be provided to other layers. A more detailed description of rendering network 204 is described below with respect to FIGS. 2b and 2c.

Figure 2B:
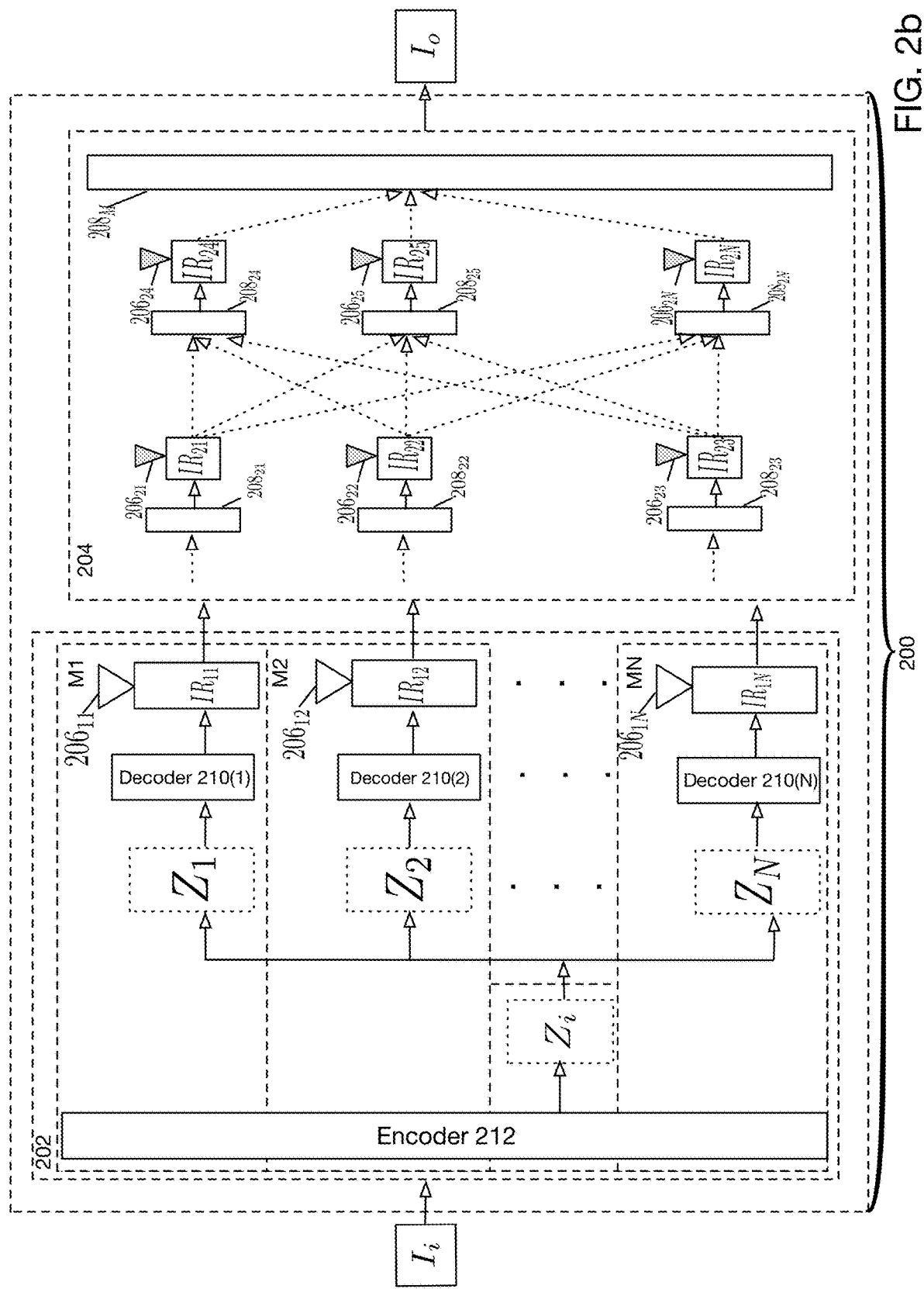
FIG. 2b is a detailed block diagram of a network architecture for performing facial image manipulation according to one embodiment of the present disclosure.

FIG. 2b is a more detailed block diagram of a facial image manipulation network according to one embodiment of the present disclosure. As discussed with reference to FIG. 2a, facial image manipulation network 200 comprises disentanglement network 202 and rendering network 204, and the previous relevant discussion with respect to FIG. 2a is equally applicable here. As further shown in FIG. 2b, disentanglement network 202 comprises encoder 212 and decoders 210(1)-210(N). FIG. 2b also shows maps M1-MN in disentanglement network 202. Each map M1-MN represents a transformation of input image $I_i$ into a respective intermediate result $IR_{11}$-$IR_{1N}$. As described previously, each intermediate result $IR_{11}$-$IR_{1N}$ may correspond to a respective intrinsic property of an image such as albedo, illumination, etc. Thus, disentanglement network 202 may be understood to decompose or otherwise disentangle input image $I_i$ into a set of intrinsic facial representations associated with input image $I_i$, which are represented by respective intermediate results $IR_{11}$-$IR_{1N}$.

In any case, input image $I_i$ is provided to encoder 212 of the disentanglement network 202, which generates entangled latent representation $Z_i$. Disentanglement network 202 causes latent representation $Z_i$ to be disentangled into disentangled latent representations $Z_1$-$Z_N$. Each of the disentangled latent representations $Z_1$-$Z_N$ is then provided to a respective decoder 210(1)-210(N), which generates a respective intermediate result $IR_{11}$-$IR_{1N}$. It will be understood that entangled latent representation $Z_i$ and disentangled latent representations $Z_1$-$Z_N$ are represented in a different space from image space (for example, the space where input image $I_i$ and output image $I_o$ are represented). In particular, latent representations $Z_i$ and $Z_1$-$Z_N$ are typically lower dimensional representations than those of image space.

Further, as depicted in FIG. 2b, each intermediate result $IR_{11}$-$IR_{1N}$ is associated with a respective loss function $206_{11}$-$206_{1N}$. Although FIG. 2b shows only a single loss function associated with each respective intermediate result (for example, $206_{11}$ and $IR_{11}$) it will be understood that in alternative embodiments, multiple loss functions may be associated with each or any intermediate result. Each intermediate loss function $206_{11}$-$206_{1N}$ may be utilized during a learning/training phase of facial image manipulation network 200 to determine optimal weights and biases for artificial neural units. Techniques for utilizing loss functions $206_{11}$-$206_{1N}$ during a training/learning phase of facial image manipulation network 200 are described below.

As previously explained, facial image manipulation network 200 further comprises rendering network 204. As depicted in FIG. 2b, rendering network 204 comprises a plurality of layers $208_{21}$-$208_{2N}$, each of which may generate a respective intermediate result $IR_{21}$-$IR_{2N}$. Each of the intermediate results $IR_{21}$-$IR_{2N}$ may be associated with a respective intermediate loss function $206_{21}$-$206_{2N}$. Similar to intermediate loss functions $206_{11}$-$206_{1N}$, each intermediate loss function $206_{21}$-$206_{2N}$ may be utilized during a learning/training phase of facial image manipulation network to determine optimal weights and biases for artificial neural units in facial image manipulation network 200. Techniques for utilizing loss functions $206_{21}$-$206_{2N}$ with respect to a particular image formation equation 206 during a training/learning phase of facial image manipulation network 200 are described below.

It will be understood that each of layers $208_{21}$-$208_{2N}$ comprising rendering network 204 may represent a single neural network layer or multiple neural network layers. Further, layers $208_{21}$-$208_{2N}$ may be arranged in architecture determined by image formation equation 206 (shown in FIG. 2a). In particular, dashed lines in FIG. 2b indicate a potential intercoupling of layers $208_{21}$-$208_{2N}$ that will depend upon image formation equation 206 in order to render a facial manipulation.

Rendering network 204 further comprises output layer $208_M$. Output layer $208_M$ generates output image $I_o$ and may be associated with one or more global loss functions (as shown in FIG. 1 at 106).

Disentanglement Network

Figure 2C:
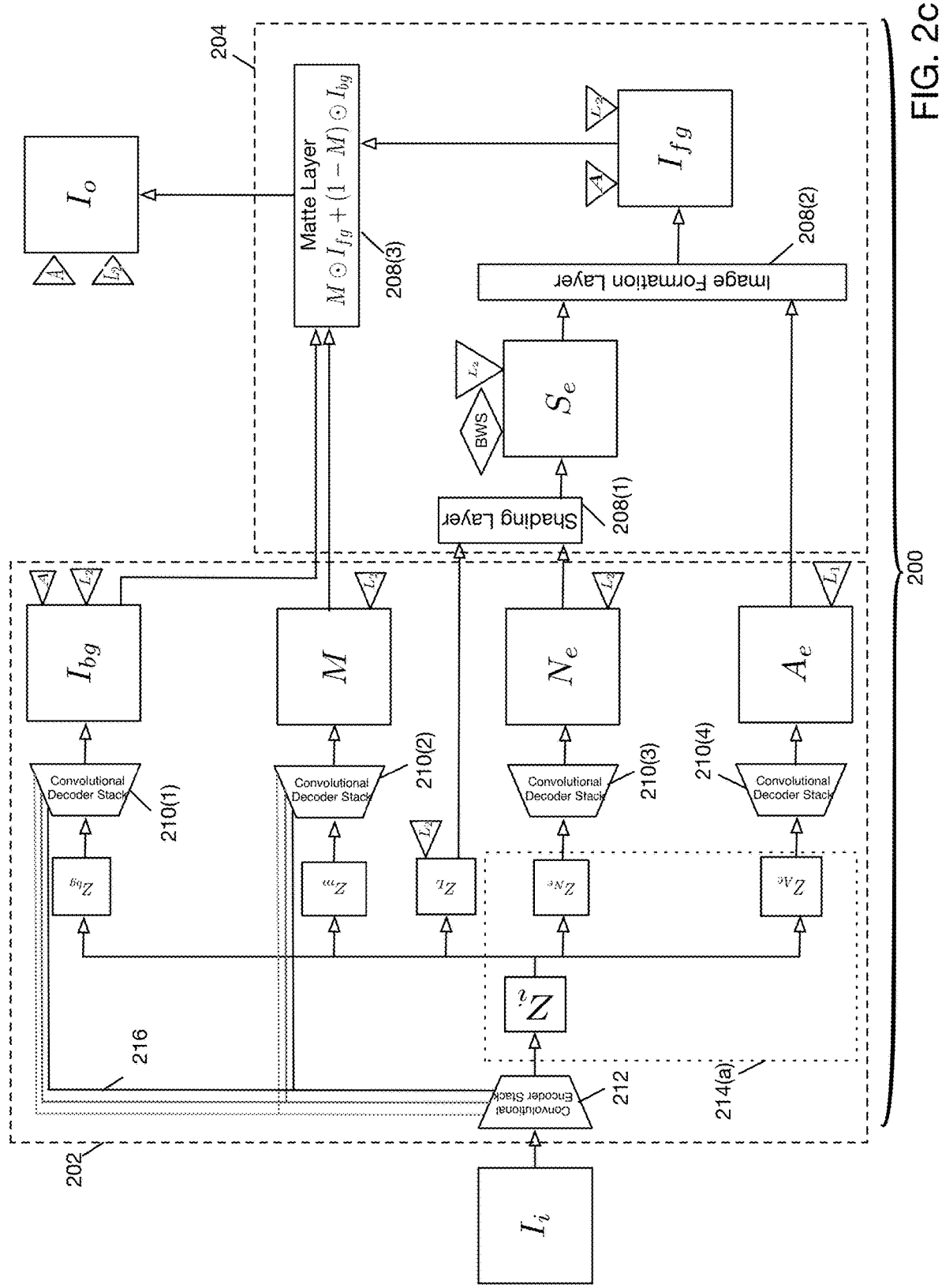
FIG. 2c is a further detailed block diagram of a network architecture for performing facial manipulation using an explicit representation of physical foreground variables utilizing image coordinate system according to one embodiment of the disclosure.

FIG. 2c is a further detailed block diagram of a network architecture for performing facial manipulation according to one embodiment of the disclosure. Facial manipulation network 200 in FIG. 2c represents one embodiment of the higher-level architecture depicted in FIGS. 2a-2b for performing facial manipulation of an image.

Referring to FIG. 2c, facial manipulation network comprises disentanglement network 202 and rendering network 204. As described previously, disentanglement network 202 disentangles input image into intrinsic facial properties, in particular, $A_e$ (Albedo), $I_{bg}$ (Background), $N_e$ (Normal), and M (Matte Mask). According to one embodiment, disentanglement network 202 is an autoencoder network. In order to perform the disentanglement, disentanglement network 202 may encode input image $I_i$ using convolutional encoder stack 212 into entangled latent representation $Z_i$. Entangled latent representation may then be disentangled into latent representations $Z_{Ae}$, $Z_{Ne}$, $Z_L$, $Z_m$ and $Z_{bg}$ corresponding to albedo, normal, illumination, matte mask, and background, respectively. Latent representations $Z_{Ae}$ $Z_{Ne}$, $Z_L$, $Z_m$, and $Z_{bg}$ pertain to intrinsic facial properties, but are represented in a lower dimensional latent space rather than image space.

Each of the latent representations $Z_{Ae}$, $Z_{Ne}$, $Z_m$, and $Z_{bg}$ is then passed to a respective decoder 210(4), 210(3), 210(2) and 210(1) and decoded into respective intermediate results $A_e$, $N_e$, M, and $I_{bg}$. It will be understood that intermediate results $A_e$, $N_e$, M, and $I_{bg}$ are generated as a map or transformation from input image $I_i$ into each respective intermediate result $A_e$, $N_e$, M and $I_{bg}$.

Disentanglement Network Loss Functions

According to one embodiment, facial manipulation network 200 may be guided during training by imposing priors respectively on each intrinsic property. In particular, each intermediate result $A_e$, $N_e$, M, and $I_{bg}$ may be associated with one or more intermediate loss functions (details of various types of loss functions reference herein are described in detail below). In particular, as shown in FIG. 2c, $A_e$ may be associated with an L1 intermediate loss function, $N_e$ may be associated with an L2 intermediate loss function, M may be associated with an L2 intermediate loss function, and $I_{bg}$ may be associated with both an A intermediate loss function and an L2 loss function. These loss functions are utilized during a training/learning phase during which facial manipulation network 200 learns associated weights and biases. Note that the intermediate loss functions associated with intermediate results $A_e$, $N_e$, M, and $I_{bg}$ are intermediate loss functions in contrast with, for example, the loss functions associated with output image $I_o$, which represents the total or global loss between the input image $I_i$ and the output image $I_o$. An example learning phase for facial manipulation network 200 will be described in detail below.

It will be understood that an L1 loss function also known as least absolute deviations ("LAD") or least absolute errors ("LAE") minimizes the absolute differences between an estimated value and a target value. In particular, if y is a target value and h(x) and estimate, L1 loss may be expressed as follows:

$$L1 = \Sigma_{i=0}^{n} |y_i - h(x_i)|.$$

The L2 loss functions shown in FIG. 2c, also known as least squares error ("LSE"), minimize a sum of squares of the difference between a target value y and estimate value h(x) as follows:

$$L2 = \Sigma_{i=0}^{n} (y_i - h(x_i))^2.$$

According to one embodiment, A signifies an adversarial loss function that pits a discriminative model against a generative model to determine whether a sample is from the model distribution or the data distribution.

Rendering Network

As previously explained, facial image manipulation network 200 further comprises rendering network 204. Rendering network 204 renders a manipulated facial image using an image formation equation based upon intermediate results $A_e$, $N_e$, M and $I_{bg}$ received from disentanglement network 202. Rendering network further utilizes latent representation $Z_L$ generated by disentanglement network 202.

Referring to FIG. 2c, rendering network 204 comprises shading layer 208(1), image formation layer 208(2) and matte layer 208(3). As previously explained with respect to FIG. 2b, these layers 208 are disentangled representations ($208_{21}$-$208_{2N}$) of input image $I_i$. Shading layer 208(1) generates shading intermediate result $S_e$ and receives as input $N_e$ and $Z_L$. Image formation layer 208(2) generates image foreground intermediate result $I_{fg}$ and receives as input $A_e$ and $S_e$. Matte layer 208(3) generates output image $I_o$ from $I_{bg}$, $I_{fg}$, and M. Note that shading intermediate result $S_e$ is associated with an L2 intermediate loss function and a BWS constraint. Image foreground intermediate result $I_{fg}$ is associated with an L2 intermediate loss function and an adversarial intermediate loss function. Output image $I_o$ is associated with a main L2 loss function and a main adversarial loss function.

An example image formation equation informing the architecture of rendering network shown in FIG. 2c will now be described. Although FIG. 2c shows one particular architecture for rendering network determined by a particular image formation equation, it will be understood that other image formation equations may be utilized according to techniques described herein in which case rendering network 204 would typically assume a different architecture. Subsequently, an example network architecture of rendering network 204 informed by the image formation equation will be described.

According to one embodiment $I_{fg}$ is a result of a rendering process $f_{rendering}$ based upon $A_e$, $N_e$ and L as follows:

$$I_{fg} = f_{rendering}(A_e, N_e, L).$$

Assuming Lambertian reflectance and adopting Retinex theory to separate the albedo (reflectance) from the geometry and illumination, $I_{fg}$ may be expressed as follows:

$$I_{fg} = f_{image-formation}(A_e, S_e) = A_e \odot S_e,$$

whereby $\odot$ denotes a per-element production operation in the image space and:

$$S_e = f_{shading}(N_e, L).$$

If these previous two equations are differentiable, they can be represented as in-network-layers in an autoencoder network. This allows representation of an image using disentangled latent variables for physically meaningful (intrinsic) factors in the image formation process and in particular $Z_{Ae}$, $Z_{Ne}$, and $Z_L$. This is advantageous over conventional approaches using a single latent variable that encodes the combined effects of all image formation factors. In particular, each of the disentangled latent variables $Z_{Ae}$, $Z_{Ne}$, and $Z_L$ allows access to a specific manifold where semantically relevant edits can be performed while keeping irrelevant latent variables fixed. For example, image relighting may be performed by only traversing the lighting manifold $Z_L$ or changing the albedo (for example, to grow a beard) by traversing $Z_{Ae}$.

In practice, the shading process utilizing geometry $N_e$, and illumination L under unconstrained conditions may result in $f_{shading}(\cdot, \cdot)$ being a discontinuous function in a significantly large portion of the space it represents. In order to address these issues, according to one embodiment, distant illumination L is represented by spherical harmonics such that the Lambertian $f_{shading}$ (·,·) has an analytical form and is differentiable.

According to one embodiment L is represented by a 9-dimensional vector (spherical harmonics coefficients). For a given pixel i, with its normal $n_i=[n_x, n_y, n_z]^T$, the shading for pixel i is rendered as $S_e^i=S_e(n_i,L)=[n_i; 1]^T K[n_i; 1]$ where $$K = \begin{bmatrix} c_1 L_9 & c_1 L_5 & c_1 L_8 & c_2 L_4 \\ c_1 L_5 & -c_1 L_9 & c_1 L_6 & c_2 L_4 \\ c_1 L_8 & c_1 L_6 & c_3 L_7 & c_2 L_3 \\ c_2 L_4 & c_2 L_2 & c_2 L_3 & -c_4 L_1 - c_5 L_7 \end{bmatrix},$$

$c_1 = 0.429043$, $c_2 = 0.511664$, and
$c_3 = 0.743125$, $c_4 = 0.886227$, $c_5 = 0.247708$.

In-Network Face Representation—Explicit

According to one embodiment as shown in FIG. 2c, image formation and shading variables are defined in the image coordinate system. This naturally leads to explicit representation of physical foreground facial variables (214(a)) $N_e$ and $A_e$. FIG. 2c, and in particular 214(a), depict a model whereby explicit normal and albedo are realized by their corresponding respective latent variables $Z_{Ne}$ and $Z_{Ae}$. Note that the lighting L is represented by spherical harmonics and is independent of the facial representation. According to this embodiment, the lighting spherical harmonics is realized directly as its parameters and hence $Z_L=L$ is directly used by the shading layer (described in detail below).

In-Network Face Representation—Implicit

Figure 2D:
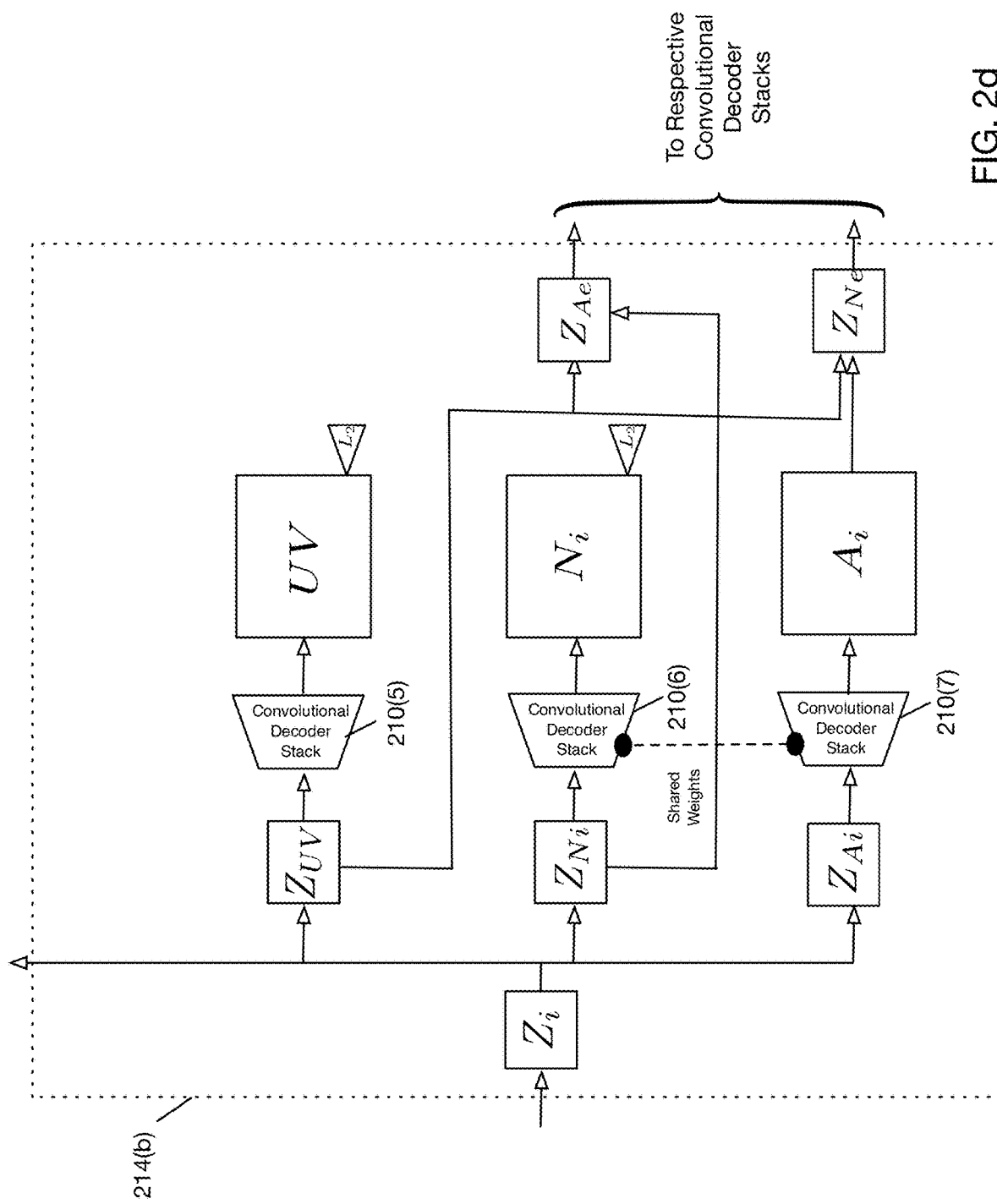
FIG. 2d is a detailed block diagram depicting an implicit representation for physical foreground variables using a facial coordinate system according to one embodiment of the present disclosure.

Although the explicit representation depicted in FIG. 2c helps to disentangle certain quantities and allows for edits to more intuitively relate to the latent variable manifolds (relighting), in certain instances it may not be satisfactory. For example, pose and expression edits, such as smile edits, modify both the explicit per-pixel normal as well as the per-pixel albedo in image space. In order to address this issue, according to an alternative embodiment depicted in FIG. 2d, an implicit representation may be utilized such that the parameterization is over a face coordinate system rather than an image coordinate system. Utilizing this alternative embodiment and coordinate system allows further constraints on pose and expression changes to the shape (normal) space only. In particular, referring to FIG. 2d, in alternative embodiments, block 214(a) in FIG. 2c is replaced with block 214(b) in FIG. 2d. Intermediate result UV shown in FIG. 2d represents per-pixel face space UV-Coordinates. $N_i$ and $A_i$ represent normal and albedo maps in the face universal coordinate system while $Z_{UV}$, $Z_{Ni}$ and $Z_{Ai}$ represent the corresponding latent variables respectively.

In-Network Background Matting

According to one embodiment, to encourage physically based representations of albedo, surface normals, and lighting to concentrate on the face region, the background may be disentangled from the foreground. According to one embodiment, matte layer 208(3) computes the compositing of the foreground onto the background as follows:

$$I_o = M \odot I_{fg} + (1-M) \odot I_{bg}.$$

Matte layer 208(3) also allows the employment of efficient skip layers where unpooling layers in the decoder stack can use the pooling switches from the corresponding encoder stack of the input image (216).

Because the mapping between the pooling and unpooling switches establishes a skip connection between the encoder and the decoder, the details of the background are significantly preserved. Such skip connections may bypass the bottleneck Z and therefore only allow partial information flow through Z during training. In contrast, for the foreground face region, all the information flows through the bottleneck Z without any skip connections such that full control is maintained over the latent manifolds for editing at the expense of some detail loss.

Convolutional Encoder Stack Architecture

According to one embodiment, convolutional encoder stack 212 is comprised of three convolutions with 32*3×3, 64*3×3 and 64*3×3 filter sets. According to this same embodiment, each convolution is followed by a max-pooling and ReLU nonlinear activation function (not shown in FIG. 2c). The filter responses may be padded after each pooling layer so that the final output of the convolutional stack is a set of filter responses with size 64*8×8 for an output image of 3*64*64.

According to one embodiment, $Z_i$ is a latent variable vector of size 128×1, which is fully connected to the last encoder stack downstream as well as the individual latent variables $Z_{bg}$, $Z_L$, $Z_m$ and the foreground representations $Z_{Ne}$, $Z_{Ae}$. For the explicit representation 214(a), $Z_{fi}$ is directly connected to $Z_{Ne}$ and $Z_{Ae}$. For the implicit representation 214(b), $Z_i$ is directly connected to $Z_{UV}$, $Z_{Ni}$ and $Z_{Ai}$. According to one embodiment, all latent representations are 128×1 vectors except for $Z_L$, which represents the light L directly and is a 27×1 vector where three 9×1 concatenated vectors represent spherical harmonics of red, blue and green lights.

According to one embodiment, all convolutional decoder stacks 210(1)-210(4) are strictly symmetrical to convolutional encoder stack 212. Convolutional decoder stacks 210(1) and 210(2) may utilize skip connections to convolutional encoder 212 at corresponding layers. According to one embodiment, in the implicit representation 214(b), $Z_{Ni}$ and $Z_{Ai}$ share weights in their respective decoders because supervision is performed only for the implicit normals.

Training

Main Loss Function

According to one embodiment, training may be performed using "in-the-wild" facial images. This means that access is provided only to the image itself (denoted by I*). Thereby, no ground-truth data is available for illumination, normal, or albedo.

According to one embodiment a main loss function imposed for the reconstruction of image $I_i$ at the output $I_o$ is:

$$E_o = E_{recon} + \lambda_{adv} E_{adv}.$$

According to this relationship, $E_{recon} = \|I_i - I_o\|^2$ and $E_{adv}$ is an adversarial loss function such that a discriminative network is trained simultaneously to distinguish between generated and real images. According to one embodiment, an energy-based method is utilized to incorporate adversarial loss. According to this method, an autoencoder is utilized as a discriminative network, $\mathcal{D}$. The adversarial loss may be defined as $E_{adv} = D(I')$ for the generative network $\mathcal{D}$. Here I' is the reconstruction of the discriminator input $I_o$ and D(·) is an L2 reconstruction loss of the discriminative network $\mathcal{D}$.

In this case, $\mathcal{D}$ may be trained to minimize the reconstruction error (L2) for real facial images while maximizing the reconstruction error with a margin for $I_o$.

Intermediate Loss Functions

A fully unsupervised training using only the reconstruction and adversarial loss on the output image $I_o$ will often result in semantically meaningless latent representations. The network architecture itself cannot prevent degenerate solutions such as constant $S_e$ where $A_e$ captures both albedo and shading information. Because each of the rendering elements has a specific physical meaning and they are explicitly encoded as intermediate layers in the network, according to one embodiment, additional constraints may be introduced through intermediate loss functions to guide the training.

In particular, according to one embodiment a "pseudo ground-truth" $\hat{N}$ for the normal representation $N_e$ may be introduced to maintain $N_e$ close to plausible face normals during the training process. $\hat{N}$ may be estimated by fitting a rough facial geometry to every image in a training set using a 3D morphable model. According to one embodiment, the following L2 intermediate loss function may then be introduced for $N_e$:

$$E_{recon-N} = \|N_e - \hat{N}\|^2.$$

According to other embodiments, similar to $\hat{N}$, an L2 reconstruction loss $\hat{L}$ may be introduced with respect to the lighting parameters $Z_L$:

$$E_{recon-L} = \|Z_L - \hat{L}\|^2.$$

$\hat{L}$ may be computed from $\hat{N}$ and the input image $I_i$ using least square optimization and constant albedo assumption.

According to other embodiments, following Retinex theory, wherein albedo is assumed to be piecewise constant and shading to be smooth, an L1 smoothness loss may be introduced for albedo as follows:

$$E_{smooth-A} = \|\nabla A_e\|,$$

in which $\nabla$ is the spatial image gradient operator.

In addition, because shading is assumed to vary smoothly, an L2 intermediate smoothness loss may be introduced for $S_e$ as follows:

$$E_{smooth-S} = \|\nabla S_e\|^2.$$

For the implicit coordinate system (UV) (FIG. 3b), according to one embodiment L2 supervisions may be applied to both UV and $N_i$ as follows:

$$E_{UV} = \|UV - \widehat{UV}\|^2,$$

and $$E_{N_i} = \|N_i - \hat{N}_i\|^2.$$

$\widehat{UV}$ and $\hat{N}_i$ may be obtained from a morphable model in which vertex-wise correspondence on a 3D fit exists. In particular, an average shape of the morphable model $\bar{S}$ may be used to establish a measurement over coordinates (UV) and surface normal ($N_i$), which is propagated to each shape estimation via this correspondence.

Batch-Wise Shading Constraint

Due to the ambiguity in the magnitude of lighting and therefore the intensity of shading, it may be necessary to introduce constraints on the shading magnitude to prevent the network from generating arbitrary bright/dark shading. Moreover, because the illumination is separated in color space, by individual $L_r$, $L_g$ and $L_b$, according to one embodiment a constraint may be imposed to prevent the shading to be too strong in one color channel compared to the others.

To handle these ambiguities, according to one embodiment, a Batch-wise White Shading ("BWS") constraint may be introduced on $S_e$ as follows:

$$\frac{1}{m}\sum_{i,j} s_r^i(j) = \sum_{i,j} s_g^i(j) = \sum_{i,j} s_b^i(j) = c,$$

where $s_r^i(j)$ denotes the j-th pixel of the i-th example in the first (red) channel of $S_e$. $s_g$ and $s_b$ denote the second and third channel of shading respectively. m is the number of pixels in a training batch. According to one embodiment c is set to 0.75.

Because $\hat{N}$ obtained by the previously described morphable model addresses a region of interest only on the surface of a face, according to one embodiment, it is used as a mask and all foreground losses are computed under this face mask. In addition, according to one embodiment, the region of interest is also used as a mask pseudo ground truth at training time for learning the matte mask:

$$E_M = \|M - \hat{M}\|^2,$$

in which $\hat{M}$ represents the morphable model mask.

Process for Network Construction

Figure 3:
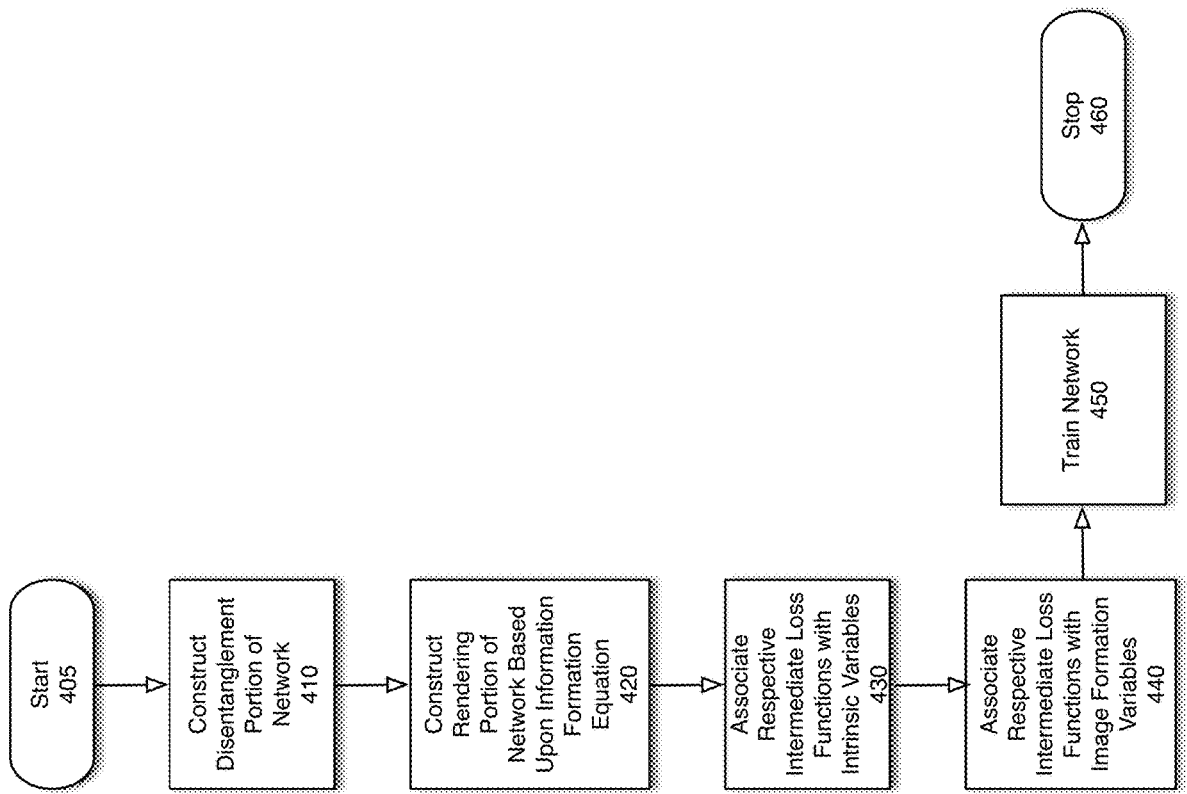
FIG. 3 is a flowchart depicting a process for generating a network for facial manipulation in accordance with an embodiment of the present disclosure.

FIG. 3 is a flowchart depicting a process for generating a network for facial manipulation in accordance with an embodiment of the present disclosure. The process is initiated in 405. In 410, a disentanglement portion of the network is created in order to disentangle a given facial image into intrinsic properties. As previously described, according to one embodiment, the disentanglement network may utilize an autoencoder. In 420, a rendering portion of the network is constructed based upon an image formation equation. In 430, intermediate loss functions are associated with intrinsic variables generated by the disentanglement network. In 440, intermediate loss functions are associated with image formation variables in the rendering network. In 450, the network comprising the conglomerate of the disentanglement network and rendering network is trained using a suitable process such as backpropagation and gradient descent. The process ends in 460.

Face Editing by Manifold Traversal

Figure 4:
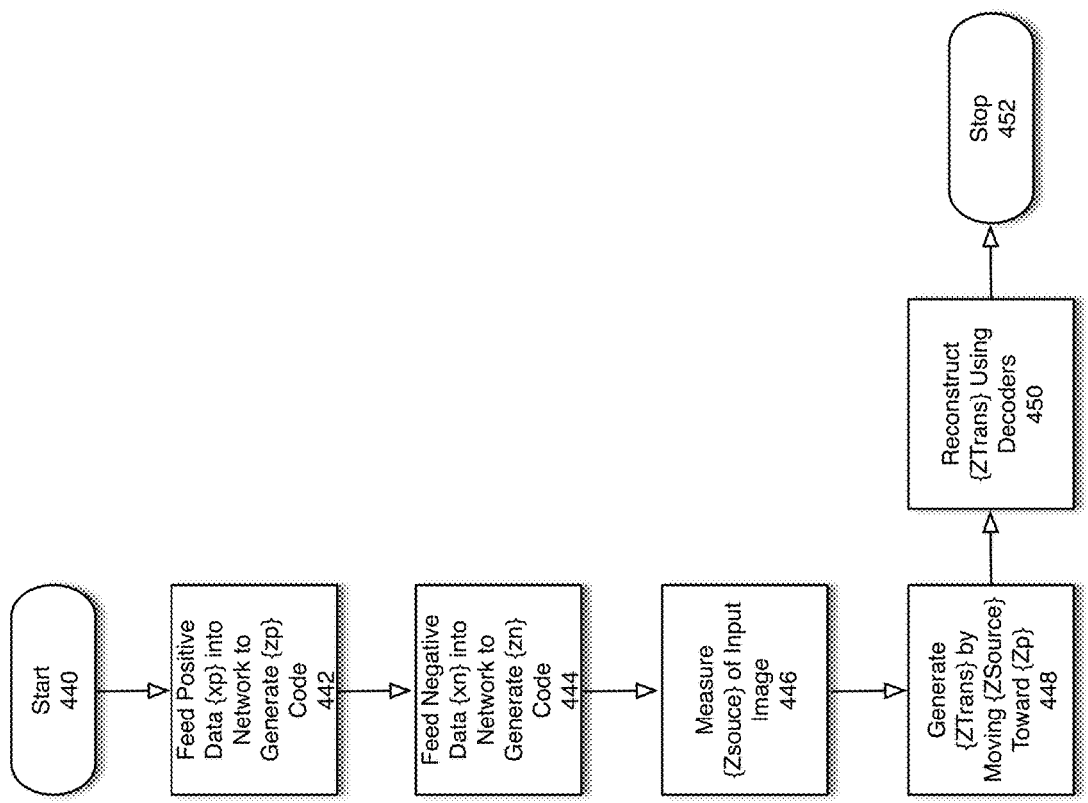
FIG. 4 is a flowchart depicting a method for performing face editing using manifold traversal according to one embodiment of the present disclosure.

FIG. 4 is a flowchart depicting a method for performing face editing using manifold traversal according to one embodiment of the present disclosure. The networks depicted in FIGS. 2c-2d allow manipulation of semantic face attributes (for example, expression, facial hair, age, makeup and eyewear) by traversing the manifolds of the disentangled latent spaces that are most appropriate for that edit. Referring to FIG. 4, the process is initiated in 440. In 442, positive data $\{x_p\}$ (e.g., smiling faces) is fed into either the network depicted in FIG. 2c or FIG. 2d to generate Z-codes $\{z_p\}$. In 444, negative data $\{x_n\}$ (for example, faces with other expressions) is fed into either the network depicted in FIG. 2c or FIG. 2d to generate Z-codes $\{z_n\}$. $\{z_p\}$ and $\{z_n\}$ represent corresponding empirical distributions on the low-dimensional Z-space(s). In 446, the empirical distribution of an input image $\{Z_{Source}\}$ is measured. In 448, $\{Z_{Trans}\}$ is generated from $\{Z_{source}\}$ by moving the distribution $\{Z_{Source}\}$ toward $\{z_p\}$. In 450, a reconstructed (manipulated) facial image is generated by decoding $\{Z_{Trans}\}$. The process ends in 452.

According to one embodiment, in order to compute the distributions for each attribute to be manipulated, a subset of images from a facial image database such as CelebA may be sampled (for example, 2000 images) with the appropriate attribute label (for example, smiling or other expressions). Then, a manifold traversal method may be employed independently on each appropriate variable. The extent of traversal may be parameterized by a regularization parameter λ (see, for example, Gardner et al., "Deep Manifold Traversal: Changing Labels With Convolutional Features", arXiv preprint: arXiv: 1511.06421, 2015).

Experiments

According to one embodiment the CelebA dataset may be utilized to train facial manipulation network 200. During this training, for each facial image, landmarks may be detected and a 3D morphable model may be fitted to the facial region to develop a rough estimation of the rendering elements ($\hat{N}$, $\hat{L}$). These estimates may then be utilized to setup the previously described intermediate loss functions.

Baseline Comparisons

Figure 5A:
FIG. 5a depicts various facial transformations and underlying intrinsic properties comparing a baseline reconstruction generated using a standard autoencoder to a reconstruction generated using an embodiment of the present disclosure.

FIG. 5a depicts various facial transformations and underlying intrinsic properties comparing a baseline reconstruction using an autoencoder to perform a reconstruction utilizing techniques described in the present disclosure. For comparison with results generated by facial manipulation network 200 described herein, an autoencoder B was trained as a baseline. The encoder and decoder of B was identical to the encoder and decoder for $A_e$ in the architecture shown in FIG. 2c. To make the comparisons fair, the bottleneck layer of B was set to 265 (=128+128+9) dimensions, which is more than twice as large as the bottleneck layer in the architecture shown in FIG. 2c (size 128), yielding more capacity for the baseline. Although the architecture for the network shown in FIG. 2c has a narrower bottleneck, the disentangling of latent factors and the presence of physically based rendering layers generate reconstructions that are more robust to complex background pose, illumination, occlusion, etc. (compare row 3 with row 2 in FIG. 5a).

Furthermore, given input facial images, facial manipulation network 200 described herein provides explicit access to albedo, shading and normal maps for the face (rows 4-6 of FIG. 5a). The last row of FIG. 5a compares the inferred normals from the network described herein with the normals estimated from the input image utilizing the 3D morphable model that was used to guide the training process. The data used to construct the morphable model contains only 16 identities. This small subspace of identity variation leads to normals that are often inaccurate approximations of the true face shape (row 7 in FIG. 5a). By using these estimates as weak supervision, in combination with an appearance-based rendering loss, the networks described herein are able to generate normal maps (row 6 in FIG. 5a) that extend beyond the morphable model subspace, better fit the shape of the input face and exhibit more identity information.

Smile Face Editing

Figure 5B:
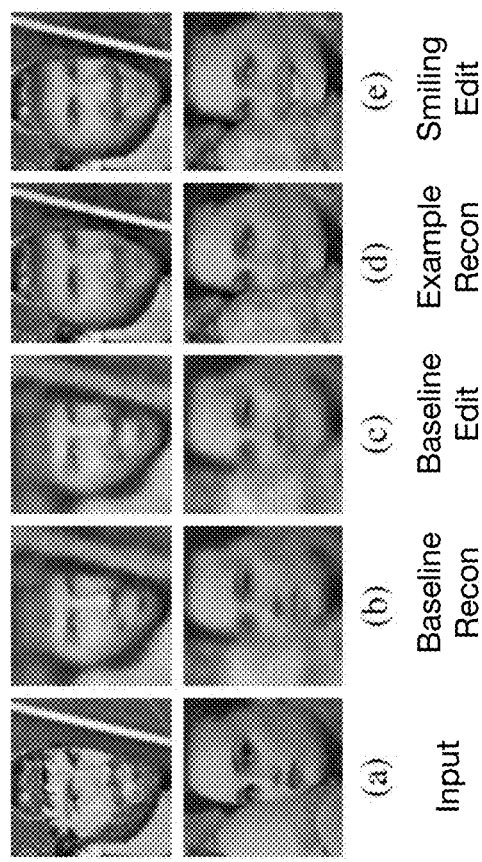
FIG. 5b depicts example smile editing via traversal on albedo and normal manifolds according to one embodiment of the present disclosure, compared to a baseline autoencoder representation.

Using the techniques described with reference to FIG. 4, given an input face image that is not smiling $I_{Source}$, this input image may be manipulated to introduce a smile. FIG. 5b depicts example smile editing via traversal on albedo and normal manifolds compared to a baseline autoencoder representation according to one embodiment of the present disclosure. The images shown in FIG. 5b were achieved by traversing albedo and normal variables to produce edits that make the faces smile. Further, they are able to capture changes in expression and the appearance of teeth while preserving other aspects of the image. In contrast, the results achieved by traversing the baseline latent space are much poorer and are unable to reconstruct the pose and identity of the input properly.

Figure 5C:
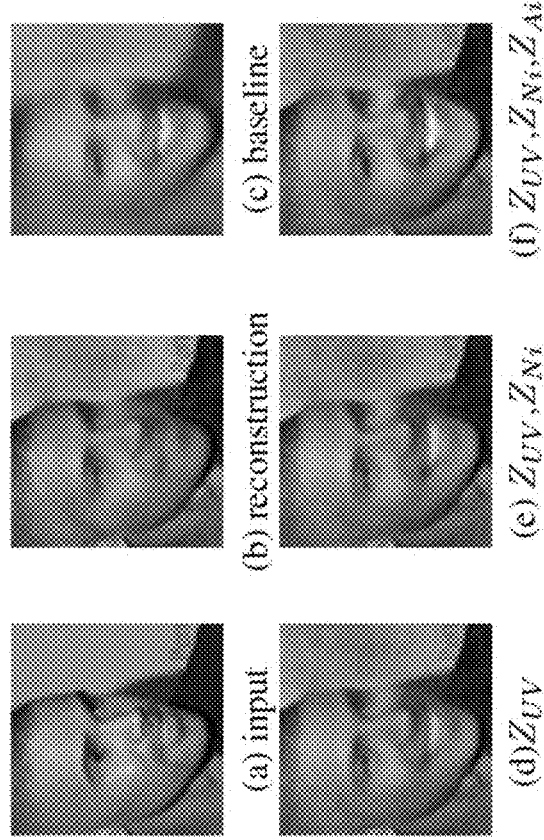
FIG. 5c depicts example smile editing using implicit factor traversal according to one embodiment of the present disclosure.

FIG. 5c depicts example smile editing using implicit factor traversal according to one embodiment of the present disclosure. While lips/mouth may map to the same region of image space, they are in fact separated in the face UV-space. This allows the implicit variables to learn more targeted and accurate representations and in doing so, traversing $Z_{UV}$ alone results in a smiling face. Compare images (b), (d), (e) and (f) to (c) in FIG. 5b. Combining this with traversal on $Z_{Ni}$ exaggerates the smile. In contrast, smiling is not expected to be correlated with the implicit albedo space and traversing on $Z_{Ai}$ may lead to worse results with an incorrect frontal pose.

Figure 5D:
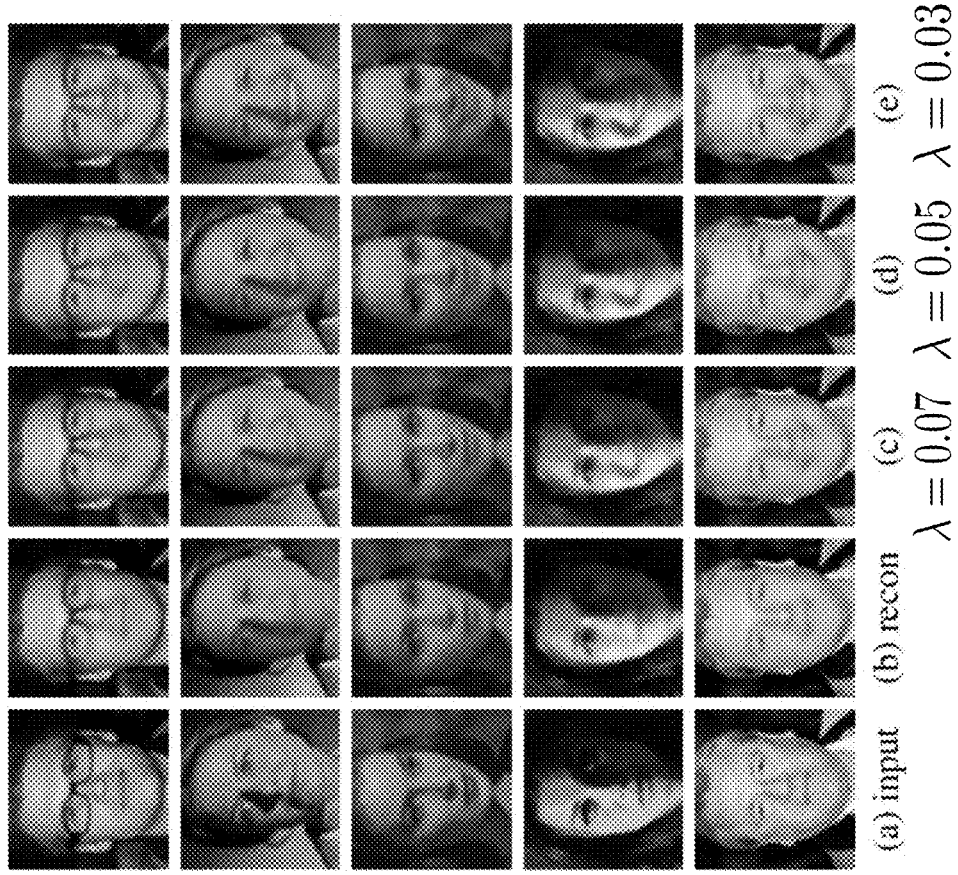
FIG. 5d depicts example smile editing using progressive traversal on the bottleneck manifolds $Z_{UV}$ and $Z_{Ni}$ according to one embodiment of the present disclosure.

FIG. 5d depicts example smile editing using progressive traversal on the bottleneck manifolds $Z_{UV}$ and $Z_{Ni}$ according to one embodiment of the present disclosure. FIG. 5d demonstrates that relaxing the traversal regularization parameter λ, gradually leads to stronger smiling expressions.

Aging Face Editing

Figure 5E:
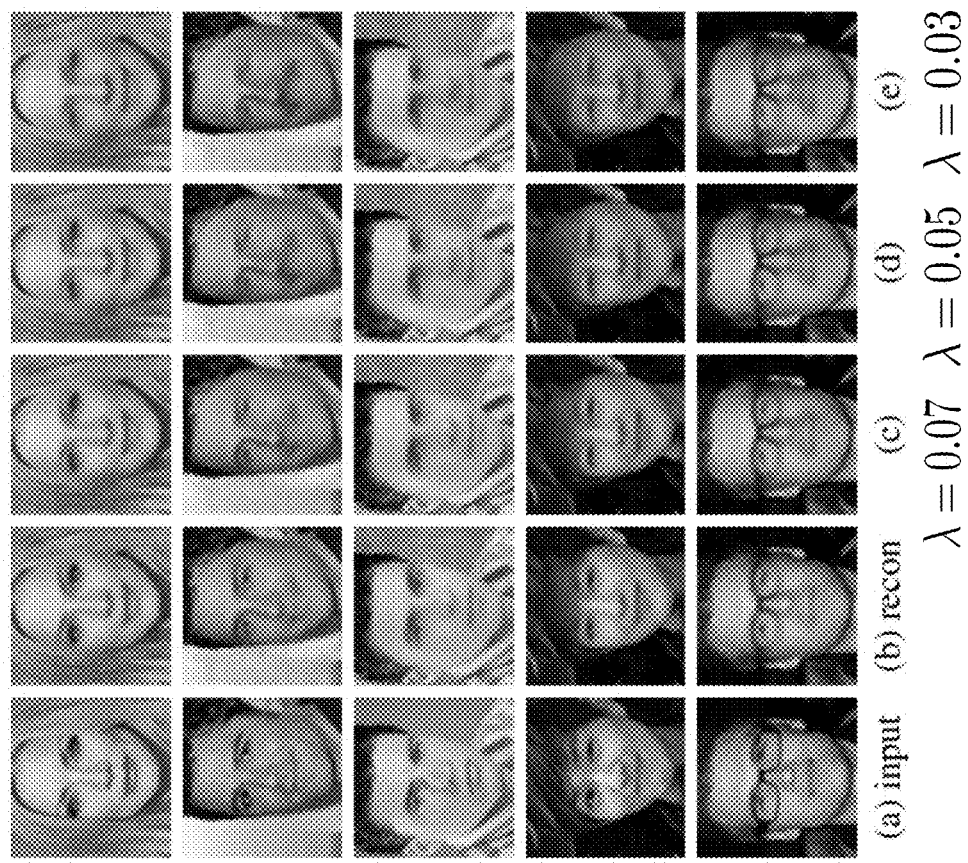
FIG. 5e depicts example aging manipulation using progressive traversal on albedo and normal manifolds according to one embodiment of the present disclosure.

FIG. 5e depicts example aging manipulation using progressive traversal on albedo and normal manifolds according to one embodiment of the present disclosure. According to one embodiment, a latent space distribution may be constructed using images and labels from the PubFig dataset corresponding to the most and least senior images. It is expected that aging will be correlated with both shape and texture. Thus, as shown in FIG. 5e, traversing on these manifolds leads to convincing age progression.

Relighting

Figure 5F:
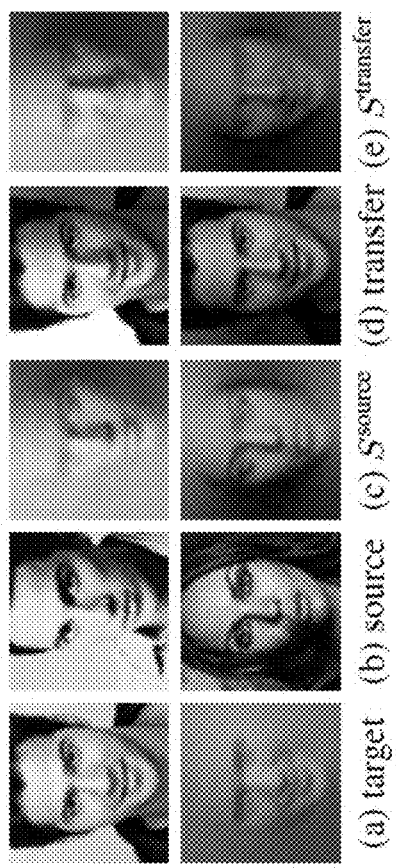
FIG. 5f depicts example lighting transfer according to one embodiment of the present disclosure.

FIG. 5f depicts example lighting transfer according to one embodiment of the present disclosure. An advantage of the albedo-normal-light decomposition achieved using networks depicted in FIG. 2c and FIG. 2d is that it allows manipulation of the illumination of an input face via $Z_L$ while maintaining the other latent variables as fixed. According to one embodiment, a face may be relit by replacing its $Z_L^{target}$ with some other $Z_L^{source}$ (for example, using the lighting variable of another face). While the facial manipulation networks 200 depicted in FIGS. 2c-2d are trained to reconstruct the input, due to limited capacity (especially due to the bottleneck layer dimensionality), the reconstruction does not reproduce all details of the input image. For illumination editing, however, according to one embodiment, the shading may be manipulated. In particular, according to this technique, a source and target image $I^{source}$, $I^{target}$ may be provided to the network to estimate their individual factors. Using a target shading $S^{target}$, and the following relation:

$$I_{fg}=f_{image\text{-}formation}(A_e,S_e)=A_e \odot S_e$$

a detailed albedo $A^{target}$ may be generated. Given a light source $L^{source}$, the shading of the target may be rendered under this light with the target normals $N^{target}$ given by:

$$S_e=f_{shading}(N_e,L),$$

to obtain the transferred $S^{transfer}$. Finally, the lighting transferred image may be rendered with $S^{transfer}$ and $A^{target}$ using the relation:

$$I_{fg}=f_{image\text{-}formation}(A_e,S_e)=A_e \odot S_e.$$

FIG. 5f illustrates examples in which the lighting of two sources having disparate identities, genders and poses is transferred to a target while retaining all of its details.

Facial image manipulation network 200 and its various functional block may be implemented on a computing device such as a general-purpose or application specific CPU that includes one or more storage devices and/or non-transitory computer-readable media having encoded thereon one or more computer-executable instructions or software for implementing techniques as variously described in this disclosure. In some embodiments, the storage devices include a computer system memory or random access memory, such as a durable disk storage (for example, any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device includes other types of memory as well, or combinations thereof. In one embodiment, the storage device is provided on the computing device. In another embodiment, the storage device is provided separately or remotely from the computing device. The non-transitory computer-readable media include, but are not limited to, one or more types of hardware memory, non-transitory tangible media (for example, one or more magnetic storage disks, one or more optical disks, one or more USB flash drives), and the like. In some embodiments, the non-transitory computer-readable media included in the computing device store computer-readable and computer-executable instructions or software for implementing various embodiments. In one embodiment, the computer-readable media are provided on the computing device. In another embodiment, the computer-readable media are provided separately or remotely from the computing device.

Figure 6A:
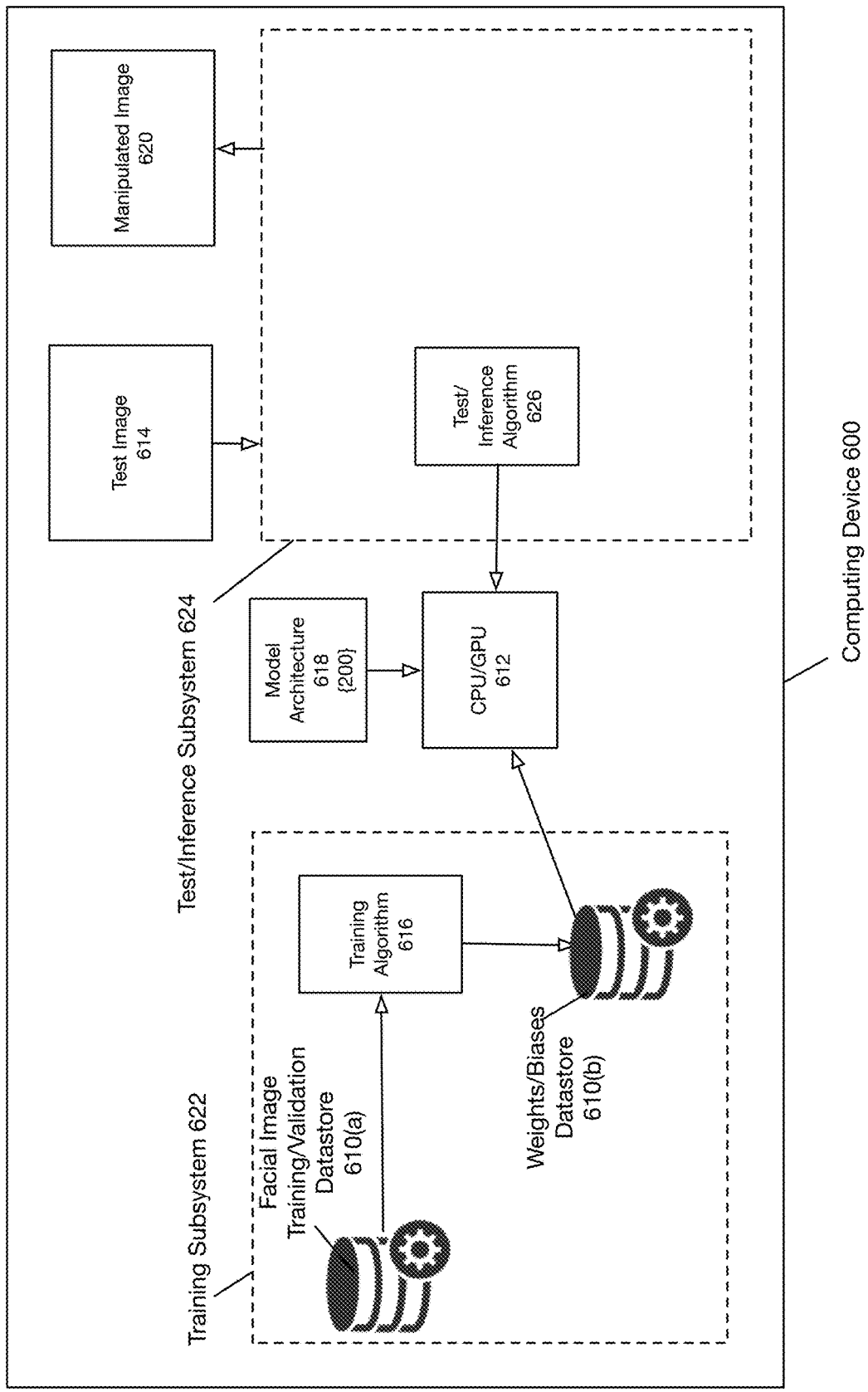
FIG. 6a illustrates an example computing system that executes a facial manipulation network in accordance with embodiments of the present disclosure.

FIG. 6a illustrates an example computing system that executes a facial manipulation network in accordance with embodiments of the present disclosure. As depicted in FIG. 6a, computing device 600 includes CPU/GPU 612, training subsystem 622 and test/inference subsystem 624. Training subsystem 622 and test/inference subsystem 624 may be understood to be programmatic structures for carrying out training and testing of network 200. In particular, CPU/GPU 612 may be further configured via programmatic instructions to execute training and/or testing of network 200 (as variously described herein, such as with respect to FIGS. 3-4). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. For instance, project store 106 may be external to the computing device 600. Computing device 600 can be any stand-alone computing platform, such as a desk top or work station computer, laptop computer, tablet computer, smart phone or personal digital assistant, game console, set-top box, or other suitable computing platform.

Training subsystem 622 further comprises facial image training/validation datastore 610(a), which stores training and validation facial images. Training algorithm 616 represents programmatic instructions for carrying out training of network 200 in accordance with the training described herein. As shown in FIG. 6a, training algorithm 616 receives training and validation facial images from training/validation datastore 610(a) and generates optimal weights and biases, which are then stored in weights/biases datastore 610(b). As previously described, training may utilize a backpropagation algorithm and gradient descent or some other optimization method.

Test/Inference subsystem further comprises test/inference algorithm 626, which utilizes network 200 and the optimal weights/biases generated by training subsystem 622. CPU/GPU 612 may then carry out test/inference algorithm 626 based upon model architecture and the previously described generated weights and biases. In particular, test/inference subsystem 624 may receive test image 614 from which it may generate a manipulated image 620 using network 200.

Figure 6B:
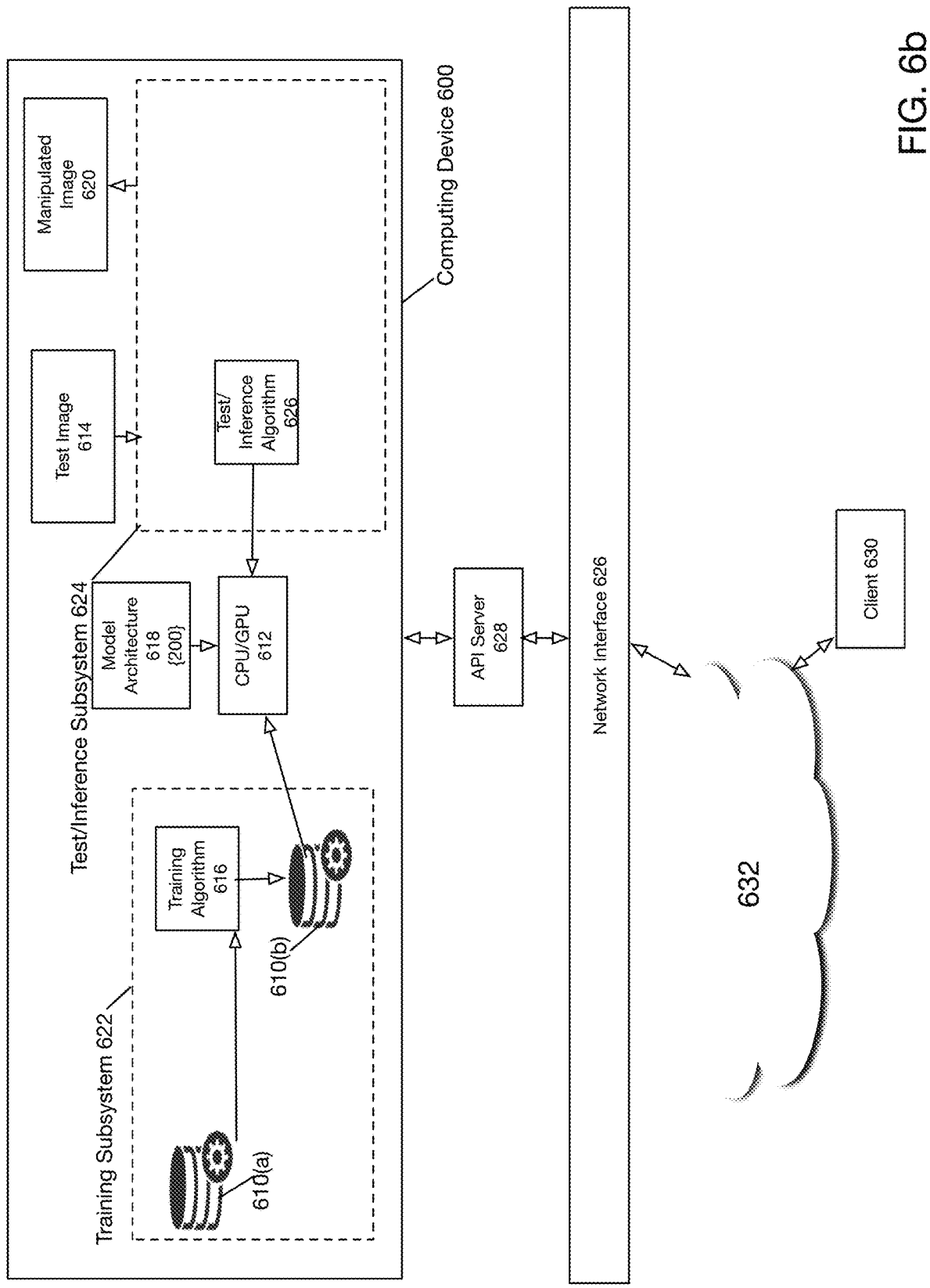
FIG. 6b illustrates an example integration of a facial manipulation network into a communications network environment according to one embodiment of the present disclosure.

FIG. 6b illustrates an example integration of a facial manipulation network into a network environment according to one embodiment of the present disclosure. As depicted in FIG. 6b, computing device 600 may be collocated in a cloud environment, data center, local area network ("LAN") etc. Computing device 600 shown in FIG. 6b is structured identically to the example embodiment described with respect to FIG. 6a. In this instance, computing device 600 may be a server or server cluster, for example. As shown in FIG. 6b, client 600 interacts with computing device 600 via network 632. In particular, client 630 may make requests and receive responses from personalized creator recommendation system via API calls received at API server 628, which are transmitted via network 632 and network interface 626. It will be understood that network 632 may comprise any type of public or private network including the Internet or LAN.

It will be further readily understood that network 508 may comprise any type of public and/or private network including the Internet, LANs, WAN, or some combination of such networks. In this example case, computing device 500 is a server computer, and client 506 can be any typical personal computing platform. Further note that some components of the creator recommendation system 102 may be served to and executed on the client 506, such as a user interface by which a given user interacts with the system 102. The user interface can be configured, for instance, similar to the user interface of Behance® in some embodiments. In a more general sense, the user interface may be configured, for instance, to allow users to search for and view creative works, and to follow or appreciate certain creators for which the viewer has affinity. The user interface can be thought of as the front-end of the creative platform. The user interface may further be configured to cause display of an output showing ranked creators, such as shown in FIG. 3e. Other so-called back-end components of system 102 can be executed on the server device 500 in some such embodiments. Any number of client-server schemes can be used.

As will be further appreciated, computing device 600, whether the one shown in FIG. 6a or 6b, includes and/or otherwise has access to one or more non-transitory computer-readable media or storage devices having encoded thereon one or more computer-executable instructions or software for implementing techniques as variously described in this disclosure. The storage devices may include any number of durable storage devices (for example, any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 200, may be implemented in software, such as a set of instructions (for example, HTML, XML, C, C++, object-oriented C, JavaScript, Java, BASIC, etc.) encoded on any non-transitory computer readable medium or computer program product (for example, hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (for example, application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

Further Example Embodiments

The following examples pertain to further example embodiments, from which numerous permutations and configurations will be apparent.

Example 1 is a neural network architecture for manipulating a facial image, said architecture comprising: a disentanglement portion trained to disentangle at least one physical property captured in said facial image, said disentanglement portion receiving said facial image and outputting a disentangled representation of said facial image based on said at least one physical property; and a rendering portion trained to perform a facial manipulation of said facial image based upon an image formation equation and said at least one physical property, thereby generating a manipulated facial image.

Example 2 includes the subject matter of Example 1, wherein: said disentanglement portion includes at least one first layer, each of said at least one first layer encoding a respective map, wherein each map performs a transformation of said facial image to a respective first intermediate result, said respective first intermediate result associated with one of said at least one physical property; and said rendering portion includes at least one second layer arranged according to said image formation equation for manipulating said facial image, wherein said rendering portion operates on said at least one first intermediate result to generate said manipulated facial image.

Example 3 includes the subject matter of Example 2, wherein a respective first intermediate loss function is associated with each of said at least one map.

Example 4 includes the subject matter of Example 3, wherein during a training phase, each respective first intermediate loss function causes an inference of said respective map.

Example 5 includes the subject matter of any of Examples 2 through 4, wherein each of said maps further comprises a convolutional encoder stack and at last one convolutional decoder stack, each of said at least one convolutional decoder stack generating one of said respective first intermediate results.

Example 6 includes the subject matter of Example 5, wherein said convolutional encoder stack generates an entangled representation in a latent space.

Example 7 includes the subject matter of Example 1, and further includes a fully connected layer.

Example 8 includes the subject matter of Example 7, wherein said fully connected layer generates a disentangled representation in said latent space from said entangled representation.

Example 9 includes the subject matter of any of the preceding Examples, wherein said at least one physical property includes at least one of diffuse albedo, a surface normal, a matte mask, a background, a shape, illumination, and shading.

Example 10 includes the subject matter of any of the preceding Examples, wherein said at least one physical property includes at least one of geometry, illumination, texture, and shading.

Example 11 is method for generating a manipulated facial image using a neural network architecture that includes a disentanglement portion and a rendering portion, said disentanglement portion trained to disentangle at least one physical property captured in said facial image, and said rendering portion trained to perform a facial manipulation of said facial image based upon an image formation equation and said at least one physical property, said method comprising: receiving said facial image at said disentanglement portion of said neural network architecture, thereby disentangling at least one physical property captured in said facial image and outputting a disentangled representation of said facial image based on said at least one physical property; and receiving said disentangled representation of said facial image at said rendering portion of said neural network architecture, thereby generating a manipulated facial image.

Example 12 includes the subject matter of Example 11, wherein: said disentanglement portion includes at least one first layer, each of said at least one first layer encoding a respective map, wherein each map performs a transformation of said facial image to a respective first intermediate result, said respective first intermediate result associated with one of said at least one physical property; and said rendering portion includes at least one second layer arranged according to said image formation equation for manipulating said facial image, wherein said rendering portion operates on said at least one first intermediate result to generate said manipulated facial image.

Example 13 includes the subject matter of Example 12, wherein a respective first intermediate loss function is associated with each of said at least one map, and during a training phase, each respective first intermediate loss function causes an inference of said respective map.

Example 14 includes the subject matter of any of Examples 11 through 13, wherein said at least one physical property includes at least one of diffuse albedo, a surface normal, a matte mask, a background, a shape, a texture, illumination, and shading.

Examples 15 through 18 are each a computer program product including one or more non-transitory computer readable mediums encoded with instructions that when executed by one or more processors cause operations of a neural network architecture to be carried out so as to generate a manipulated facial image, said neural network architecture including a disentanglement portion and a rendering portion, said disentanglement portion trained to disentangle at least one physical property captured in said facial image, and said rendering portion trained to perform a facial manipulation of said facial image based upon an image formation equation and said at least one physical property, said operations responsive to receiving said facial image at said disentanglement portion of said neural network architecture, said operations comprising the method of any of Examples 11 through 14. The one or more non-transitory computer readable mediums may be any physical memory device, such as one or more computer hard-drives, servers, magnetic tape, compact discs, thumb drives, solid state drives, ROM, RAM, on-chip cache, registers, or any other suitable non-transitory or physical storage technology.

Example 19 is a method for generating a manipulated facial image, the method comprising: associating a respective first intermediate loss function with each of a plurality of first intermediate results generated by a first network portion, wherein each of said plurality of first intermediate results corresponds to a respective intrinsic facial property; providing said plurality of first intermediate results to a second network portion, said second network portion arranged according to an image formation equation for rendering a manipulated facial image based upon said image formation equation; performing a training by imposing a plurality of respective first intermediate loss functions upon each of said first intermediate results, to generate a plurality of weights; assigning said generated weights in said first and second network portions; and providing an input facial image to said first network portion, wherein said first network portion performs a disentanglement of a facial image into said intrinsic facial properties and second network portion receives said disentangled facial properties to generate a manipulated facial image.

Example 20 includes the subject matter of Example 19, and further includes: associating a respective second intermediate loss function with each of a plurality of second intermediate results associated with said second network portion, wherein said training further imposes said second intermediate loss function upon each of said respective second intermediate results.

Example 21 includes the subject matter of Example 19 or 20, wherein said associated intrinsic properties are at least one of albedo ($A_e$), normal ($N_e$), matte mask (M), and background ($I_{bg}$).

Example 22 includes the subject matter of Example 21, and further includes: generating a pseudo ground-truth ($\hat{N}$) for said normal representation $N_e$, wherein said pseudo ground truth is utilized in one of said first intermediate loss functions according to the relationship: $E_{recon-N} = \|N_e - \hat{N}\|^2$.

Example 23 includes the subject matter of Example 22, wherein $\hat{N}$ is estimated by fitting a rough facial geometry to every image in a training set using a 3D morphable model.

Example 24 includes the subject matter of any of Examples 21 through 23, and further includes associating an L1 smoothness intermediate loss function for $A_e$ according to the relationship: $E_{smooth-A} = \|\nabla A_e\|$, wherein $\nabla$ is a spatial image gradient operator.

Example 25 includes the subject matter of any of Examples 19 through 24, wherein generating a manipulated facial image further comprises: providing at least one positive data element ($\{x_p\}$) to said first network portion to generate a respective positive code ($\{z_p\}$); providing at least one negative data element ($\{x_n\}$) said first network portion to generate a respective negative code ($\{z_n\}$); measuring an empirical distribution of an input image ($\{Z_{Source}\}$); generating a transformed empirical distribution ($\{Z_{Trans}\}$) from $\{Z_{Source}\}$ by moving the distribution $\{Z_{Source}\}$ toward $\{z_p\}$, and generating said manipulated facial image by decoding $\{Z_{Trans}\}$.

Examples 26 through 32 are each a computer program product including one or more non-transitory machine readable mediums encoded with instructions that when executed by one or more processors cause a process to be carried out for generating a manipulated facial image from an input facial image, the process comprising the method of any of Examples 19 through 24. The previous disclosure with respect to the non-transitory computer readable medium(s) is equally applicable here.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A neural network architecture for manipulating a facial image, the architecture comprising:
   a disentanglement portion that includes one or more first neural network layers, the disentanglement portion trained to disentangle at least one physical property captured in the facial image, the disentanglement portion receiving the facial image and outputting a disentangled representation of the facial image based on the at least one physical property; and
   a rendering portion that includes one or more second neural network layers, the rendering portion trained to perform a facial manipulation of the facial image based upon an image formation equation and the at least one physical property, thereby generating a manipulated facial image.

2. The neural network architecture of claim 1, wherein the rendering portion operates on the disentangled representation of the facial image to generate the manipulated facial image.

3. The neural network architecture of claim 1, wherein the rendering portion generates the manipulated facial image in response to receiving the disentangled representation of the facial image from the disentanglement portion.

4. The neural network architecture of claim 1, wherein the disentanglement portion includes a neural network layer that encodes a map that transforms the facial image to an intermediate result associated with the at least one physical property.

5. The neural network architecture of claim 1, wherein the rendering portion includes a neural network layer arranged according to the image formation equation.

6. The neural network architecture of claim 1, wherein:
   each of a plurality of intermediate disentanglement results generated by the disentanglement portion is associated with a respective intermediate disentanglement loss function;
   each of the intermediate disentanglement results corresponds to one of the physical properties;
   each of a plurality of intermediate rendering results generated by the rendering portion is associated with a respective intermediate rendering loss function;
   the disentanglement portion is trained by (a) imposing each of the intermediate disentanglement loss functions upon its respective intermediate disentanglement result to generate a plurality of disentanglement weights, and (b) assigning the plurality of disentanglement weights in the disentanglement portion; and the rendering portion is trained by (a) imposing each of the intermediate rendering loss functions upon its respective intermediate rendering result to generate a plurality of rendering weights, and (b) assigning the plurality of rendering weights in the rendering portion.

7. A computer program product including one or more non-transitory computer readable mediums encoded with instructions that when executed by one or more processors cause operations of a neural network architecture to be carried out, the operations comprising:

receiving, by a disentanglement portion of the neural network architecture, a facial image;

disentangling, by the disentanglement portion, at least one physical property captured in the facial image;

outputting, by the disentanglement portion, a disentangled representation of the facial image based on the at least one physical property;

receiving the disentangled representation of the facial image by a rendering portion of the neural network architecture, wherein the rendering portion is trained to perform a facial manipulation of the facial image based upon an image formation equation and the at least one physical property; and generating, by the rendering portion, a manipulated facial image.

8. The computer program product of claim 7, wherein the rendering portion generates the manipulated facial image in response to receiving the disentangled representation of the facial image from the disentanglement portion.

9. The computer program product of claim 7, wherein the rendering portion operates on the disentangled representation of the facial image to generated the manipulated facial image.

10. The computer program product of claim 7, wherein the disentanglement portion includes a layer that encodes a map that transforms the facial image to an intermediate result associated with the at least one physical property.

11. The computer program product of claim 7, wherein:
each of a plurality of intermediate disentanglement results generated by the disentanglement portion is associated with a respective intermediate disentanglement loss function; and
each of the intermediate disentanglement results corresponds to one of the physical properties.

12. The computer program product of claim 7, wherein:
each of a plurality of intermediate disentanglement results generated by the disentanglement portion is associated with a respective intermediate disentanglement loss function;
each of the intermediate disentanglement results corresponds to one of the physical properties; and
each of a plurality of intermediate rendering results generated by the rendering portion is associated with a respective intermediate rendering loss function.

13. The computer program product of claim 7, wherein:
each of a plurality of intermediate disentanglement results generated by the disentanglement portion is associated with a respective intermediate disentanglement loss function;
each of the intermediate disentanglement results corresponds to one of the physical properties;
the operations further comprise imposing each of the intermediate disentanglement loss functions upon its respective intermediate disentanglement result to generate a plurality of disentanglement weights; and
the operations further comprise assigning the plurality of disentanglement weights in the disentanglement portion of the neural network.

14. The computer program product of claim 7, wherein each of a plurality of intermediate rendering results generated by the rendering portion is associated with a respective intermediate rendering loss function.

15. The computer program product of claim 7, wherein:
each of a plurality of intermediate rendering results generated by the rendering portion is associated with a respective intermediate rendering loss function;
the operations further comprise imposing each of the intermediate rendering loss functions upon its respective intermediate rendering result to generate a plurality of rendering weights; and
the operations further comprise assigning the plurality of rendering weights in the rendering portion of the neural network.

16. A method for manipulating a facial image, the method comprising:

receiving, by a disentanglement portion of a neural network architecture, a facial image;

associating a respective intermediate loss function with each of a plurality of intermediate results generated by the disentanglement portion, wherein each of the intermediate results corresponds to a property of the facial image;

providing the intermediate results to a rendering portion of the neural network architecture, the rendering portion arranged according to an image formation equation;

imposing each of the intermediate loss functions upon its respective intermediate result to generate a plurality of weights;

assigning the generated weights in the disentanglement portion;

disentangling, by the disentanglement portion, the facial image into one or more disentangled facial image properties; and generating, by the rendering portion, a manipulated facial image.

17. The method of claim 16, wherein the rendering portion receives the one or more disentangled facial image properties from the disentanglement portion.

18. The method of claim 16, wherein the rendering portion generates the manipulated facial image in response to receiving the one or more disentangled facial image properties from the disentanglement portion.

19. The method of claim 16, wherein the rendering portion operates on the one or more disentangled facial image properties to generate the manipulated facial image.

20. The method of claim 16, wherein the generated weights are assigned in the disentanglement and rendering portions.

* * * * *